(12) United States Patent
Chen et al.

(10) Patent No.: US 12,214,603 B2
(45) Date of Patent: Feb. 4, 2025

(54) METHOD FOR ENHANCING PRINTING RESOLUTION FOR PHOTOSENSITIVE IMAGING SYSTEMS

(71) Applicant: Polaroid IP B.V., Enschede (NL)

(72) Inventors: Yi-che Chen, Zhubei (TW); Bor Hon Tu, Zhubei (TW)

(73) Assignee: Polaroid IP B.V., Enschede (NL)

( * ) Notice: Subject to any disclaimer, the term of this patent is extended or adjusted under 35 U.S.C. 154(b) by 330 days.

(21) Appl. No.: 17/827,501

(22) Filed: May 27, 2022

(65) Prior Publication Data

US 2023/0382131 A1 Nov. 30, 2023

(51) Int. Cl.
| | | |
|---|---|---|
| *B41J 2/45* | (2006.01) | |
| *B41J 2/32* | (2006.01) | |
| *B41J 2/355* | (2006.01) | |
| *G06K 15/02* | (2006.01) | |
| *G06K 15/12* | (2006.01) | |
| *H04N 1/40* | (2006.01) | |
| *H04N 1/409* | (2006.01) | |

(52) U.S. Cl.
CPC . *B41J 2/45* (2013.01); *B41J 2/32* (2013.01); *B41J 2/3558* (2013.01); *G06K 15/021* (2013.01); *G06K 15/1295* (2013.01); *H04N 1/40068* (2013.01); *H04N 1/4092* (2013.01)

(58) Field of Classification Search
CPC ... B41J 2/45; B41J 2/32; B41J 2/3558; H04N 1/40068; H04N 1/4092; G06K 15/021; G06K 15/1295
See application file for complete search history.

(56) References Cited

U.S. PATENT DOCUMENTS

| | | | |
|---|---|---|---|
| 4,809,016 A | 2/1989 | Padalino | |
| 5,469,198 A | 11/1995 | Kadonaga | |
| 5,621,453 A * | 4/1997 | Fujita | H04N 1/40031 347/240 |
| 6,247,778 B1 * | 6/2001 | Iwata | H04N 1/0402 347/16 |
| 6,625,395 B2 | 9/2003 | Kitagawa | |
| 2021/0402818 A1 * | 12/2021 | Busch | B41J 2/36 |

FOREIGN PATENT DOCUMENTS

EP 0 760 289 A2 3/1997

OTHER PUBLICATIONS

International Search Report and Written Opinion for International Application No. PCT/IB2023/055388, dated Sep. 1, 2023, 14 pgs.

* cited by examiner

*Primary Examiner* — Henok D Legesse
(74) *Attorney, Agent, or Firm* — Foley & Lardner LLP

(57) ABSTRACT

A method for enhancing resolution of a radiation sensitive microcapsule-based printer includes generating multiple subpixels in a sub-scan direction. The method further includes mapping multiple grids onto a photosensitive medium, the multiple grids corresponding to the multiple subpixels. The method further includes determining an exposure energy required for each grid of the multiple grids. The method further includes allocating the exposure energy required for each grid into a first exposure level and a second exposure level. The method further includes exposing each grid of the photosensitive medium to the corresponding first exposure level and the corresponding second exposure level sequentially as the photosensitive medium passes through the radiation sensitive microcapsule-based printer in the sub-scan direction.

20 Claims, 19 Drawing Sheets

| | Total | | | | | | | | | | | | | | | | | | | | | Header |
|---|---|---|---|---|---|---|---|---|---|---|---|---|---|---|---|---|---|---|---|---|---|---|
| | | | | | | | | | | | | | | | | | | | | | | 20 |
| | | | | | | | | | | | | | | | | | | | | | | 20 |
| | | | | | | | | | | | | | | | | | | | | | | 20 |
| | | | | | | | | | | | | | | | | | | | | | | 25 |
| | | | | | | | | | | | | | | | | | | | | | | 30 |
| | | | | | | | | | | | | | | | | | | | | | | 50 |
| | | | | | | | | | | | | | | | | | | | | | | 70 |
| | | | | | | | | | | | | | | | | | | | | | | 95 |
| | | | | | | | | | | | | | | | | | | | | | | 120 |
| | | | | | | | | | | | | | | | | | | | | | | 170 |
| | | | | | | | | | | | | | | | | | | | | | | 220 |
| | | | | | | | | | | | | | | | | | | | | | | 210 |
| | | | | | | | | | | | | | | | | | | | | | | 200 |
| | | | | | | | | | | | | | | | | | | | | | | 185 |
| | | | | | | | | | | | | | | | | | | | | | | 170 |
| | | | | | | | | | | | | | | | | | | | | | | 135 |
| | | | | | | | | | | | | | | | | | | | | | | 100 |
| | | | | | | | | | | | | | | | | | | | | | | 55 |
| | | | | | | | | | | | | | | | | | | | | | | 10 |
| | | | | | | | | | | | | | | | | | | | | | | 15 |
| | | | | | | | | | | | | | | | | | | | | | | 0 |
| P1 | 20 | 20 | | | | | | | | | | | | | | | | | | | | |
| P2 | 20 | 20 | 0 | | | | | | | | | | | | | | | | | | | |
| P3 | 20 | | 0 | 20 | | | | | | | | | | | | | | | | | | |
| P4 | 25 | | | 20 | 5 | | | | | | | | | | | | | | | | | |
| P5 | 30 | | | | 5 | 25 | | | | | | | | | | | | | | | | |
| P6 | 50 | | | | | 25 | 25 | | | | | | | | | | | | | | | |
| P7 | 70 | | | | | | 25 | 45 | | | | | | | | | | | | | | |
| P8 | 95 | | | | | | | 45 | 50 | | | | | | | | | | | | | |
| P9 | 120 | | | | | | | | 50 | 70 | | | | | | | | | | | | |
| P10 | 170 | | | | | | | | | 70 | 100 | | | | | | | | | | | |
| P11 | 220 | | | | | | | | | | 100 | 120 | | | | | | | | | | |
| P12 | 210 | | | | | | | | | | | 120 | 90 | | | | | | | | | |
| P13 | 200 | | | | | | | | | | | | 90 | 110 | | | | | | | | |
| P14 | 185 | | | | | | | | | | | | | 110 | 75 | | | | | | | |
| P15 | 170 | | | | | | | | | | | | | | 75 | 95 | | | | | | |
| P16 | 135 | | | | | | | | | | | | | | | 95 | 40 | | | | | |
| P17 | 100 | | | | | | | | | | | | | | | | 40 | 60 | | | | |
| P18 | 55 | | | | | | | | | | | | | | | | | 60 | -5 | | | |
| P19 | 10 | | | | | | | | | | | | | | | | | | -5 | 15 | | |
| P20 | 15 | | | | | | | | | | | | | | | | | | | 15 | 0 | |
| P21 | 20 | | | | | | | | | | | | | | | | | | | | 0 | |

| | | | | | | | | | | | | | | | | | | | |
|---|---|---|---|---|---|---|---|---|---|---|---|---|---|---|---|---|---|---|---|
| P1 | 0 | 0 | 0 | | | | | | | | | | | | | | | | 0 |
| P2 | 10 | 0 | 0 | | | | | | | | | | | | | | | | 10 |
| P3 | 20 | 10 | 10 | | | | | | | | | | | | | | | | 20 |
| P4 | 25 | 10 | 10 | | | | | | | | | | | | | | | | 25 |
| P5 | 30 | | | 15 | 15 | | | | | | | | | | | | | | 30 |
| P6 | 50 | | | 15 | 15 | | | | | | | | | | | | | | 50 |
| P7 | 70 | | | | | 35 | 35 | | | | | | | | | | | | 70 |
| P8 | 95 | | | | | 35 | 35 | | | | | | | | | | | | 95 |
| P9 | 120 | | | | | | | 60 | 60 | | | | | | | | | | 120 |
| P10 | 170 | | | | | | | 60 | 60 | | | | | | | | | | 170 |
| P11 | 220 | | | | | | | | | 110 | 110 | | | | | | | | 220 |
| P12 | 210 | | | | | | | | | 110 | 110 | | | | | | | | 210 |
| P13 | 200 | | | | | | | | | | | 100 | 100 | | | | | | 200 |
| P14 | 185 | | | | | | | | | | | 100 | 100 | 85 | | | | | 185 |
| P15 | 170 | | | | | | | | | | | | | 85 | 85 | | | | 170 |
| P16 | 135 | | | | | | | | | | | | | | | 50 | 50 | | 135 |
| P17 | 100 | | | | | | | | | | | | | | | 50 | 50 | | 100 |
| P18 | 55 | | | | | | | | | | | | | | | | | 5 | 55 |
| P19 | 10 | | | | | | | | | | | | | | | | | 5 | 10 |
| P20 | 15 | | | | | | | | | | | | | | | | | | 15 |
| P21 | 20 | | | | | | | | | | | | | | | | | | 10 |

| | P1 | P2 | P3 | P4 | P5 | P6 | P7 | P8 | P9 | P10 | P11 | P12 | P13 | P14 | P15 | P16 | P17 | P18 | P19 | P20 | P21 |
|---|---|---|---|---|---|---|---|---|---|---|---|---|---|---|---|---|---|---|---|---|---|
| | 0 | 10 | 20 | 25 | 30 | 50 | 70 | 95 | 120 | 120 | 220 | 210 | 200 | 185 | 170 | 135 | 100 | 55 | 10 | 15 | -40 |
| | | | | | | | | | | | | | | | | | | | | -40 | -40 |
| | | | | | | | | | | | | | | | | | | | 55 | 55 | |
| | | | | | | | | | | | | | | | | | | -45 | -45 | | |
| | | | | | | | | | | | | | | | | | 100 | 100 | | | |
| | | | | | | | | | | | | | | | | 0 | 0 | | | | |
| | | | | | | | | | | | | | | | 135 | 135 | | | | | |
| | | | | | | | | | | | | | | 35 | 35 | | | | | | |
| | | | | | | | | | | | | | 150 | 150 | | | | | | | |
| | | | | | | | | | | | | 50 | 50 | | | | | | | | |
| | | | | | | | | | | | 160 | 160 | | | | | | | | | |
| | | | | | | | | | | 60 | 60 | | | | | | | | | | |
| | | | | | | | | | 60 | 60 | | | | | | | | | | | |
| | | | | | | | | 60 | 60 | | | | | | | | | | | | |
| | | | | | | | 35 | 35 | | | | | | | | | | | | | |
| | | | | | | 35 | 35 | | | | | | | | | | | | | | |
| | | | | | 15 | 15 | | | | | | | | | | | | | | | |
| | | | | 15 | 15 | | | | | | | | | | | | | | | | |
| | | | 10 | 10 | | | | | | | | | | | | | | | | | |
| | | 10 | 10 | | | | | | | | | | | | | | | | | | |
| | 0 | 0 | | | | | | | | | | | | | | | | | | | |
| | 0 | 10 | 20 | 25 | 30 | 50 | 70 | 95 | 120 | 120 | 220 | 210 | 200 | 185 | 170 | 135 | 100 | 55 | 10 | 15 | 20 |

FIG. 8

| | | | | | | | | | | | | | | | | |
|---|---|---|---|---|---|---|---|---|---|---|---|---|---|---|---|---|
| P1 | 0 | 0 | | | | | | | | | | | | | | 0 |
| P2 | 50 | 255 | 0 | | | | | | | | | | | | | 305 |
| P3 | 100 | 305 | 305 | | | | | | | | | | | | | 355 |
| P4 | 150 | 355 | 305 | | | | | | | | | | | | | 405 |
| P5 | 200 | 405 | | 50 | | | | | | | | | | | | 455 |
| P6 | 200 | 455 | | 50 | 355 | | | | | | | | | | | 455 |
| P7 | 10 | 455 | | | 355 | 100 | | | | | | | | | | 265 |
| P8 | 5 | 265 | | | | 100 | 355 | | | | | | | | | 260 |
| P9 | 0 | 260 | | | | | 355 | -90 | | | | | | | | 255 |
| P10 | 25 | 255 | | | | | | -90 | 350 | | | | | | | 280 |
| P11 | 50 | 280 | | | | | | | 350 | -95 | | | | | | 305 |
| P12 | 100 | 305 | | | | | | | | -95 | 375 | | | | | 355 |
| P13 | 150 | 355 | | | | | | | | | 375 | 425 | | | | 405 |
| P14 | 100 | 405 | | | | | | | | | | 425 | -20 | | | 355 |
| P15 | 50 | 355 | | | | | | | | | | | -20 | 375 | | 305 |
| P16 | 50 | 305 | | | | | | | | | | | | 375 | -70 | 305 |
| P17 | 250 | 305 | | | | | | | | | | | | | -70 | 505 |
| P18 | 200 | 505 | | | | | | | | | | | | | | 455 |
| P19 | 150 | 455 | | | | | | | | | | | | | | 405 |
| P20 | 150 | 405 | | | | | | | | | | | | | | 405 |
| P21 | 40 | 405 | | | | | | | | | | | | | | 295 |
| P22 | 20 | 295 | | | | | | | | | | | | | | 275 |
| P23 | 0 | 275 | | | | | | | | | | | | | | 255 |
| P24 | 27.5 | 255 | | | | | | | | | | | | | | 282.5 |
| P25 | 55 | 283 | | | | | | | | | | | | | | 310 |
| P26 | 55 | 310 | | | | | | | | | | | | | | 310 |
| P27 | 255 | 310 | | | | | | | | | | | | | | 510 |
| P28 | 227.5 | 510 | | | | | | | | | | | | | | 177.5 |
| P29 | | 483 | | | | | | | | | | | | | | 177.5 |

| | C1 | C2 | C3 | C4 | C5 | C6 | C7 | C8 | C9 | C10 | C11 | C12 | C13 | C14 | C15 | C16 | C17 | C18 | C19 | C20 | C21 | C22 | C23 | C24 | C25 | C26 | C27 | C28 |
|---|---|---|---|---|---|---|---|---|---|---|---|---|---|---|---|---|---|---|---|---|---|---|---|---|---|---|---|---|
| P1 | 0 | | | | | | | | | | | | | | | | | | | | | | | | | | | 95 |
| P2 | 50 | 255 | 95 | | | | | | | | | | | | | | | | | | | | | | | | | 305 |
| P3 | 100 | 305 | 95 | 210 | | | | | | | | | | | | | | | | | | | | | | | | 355 |
| P4 | 150 | 355 | | 210 | 145 | | | | | | | | | | | | | | | | | | | | | | | 405 |
| P5 | 200 | 405 | | | 145 | 260 | | | | | | | | | | | | | | | | | | | | | | 455 |
| P6 | 200 | 455 | | | | 260 | 195 | | | | | | | | | | | | | | | | | | | | | 455 |
| P7 | 10 | 455 | | | | | 195 | 260 | | | | | | | | | | | | | | | | | | | | 265 |
| P8 | 5 | 265 | | | | | | 260 | 5 | | | | | | | | | | | | | | | | | | | 260 |
| P9 | 0 | 260 | | | | | | | 5 | 255 | | | | | | | | | | | | | | | | | | 255 |
| P10 | 25 | 255 | | | | | | | | 255 | 0 | | | | | | | | | | | | | | | | | 280 |
| P11 | 50 | 280 | | | | | | | | | 0 | 280 | | | | | | | | | | | | | | | | 305 |
| P12 | 100 | 305 | | | | | | | | | | 280 | 25 | | | | | | | | | | | | | | | 355 |
| P13 | 150 | 355 | | | | | | | | | | | 25 | 330 | | | | | | | | | | | | | | 405 |
| P14 | 100 | 405 | | | | | | | | | | | | 330 | 75 | | | | | | | | | | | | | 355 |
| P15 | 50 | 355 | | | | | | | | | | | | | 75 | 280 | | | | | | | | | | | | 305 |
| P16 | 50 | 305 | | | | | | | | | | | | | | 280 | 225 | | | | | | | | | | | 305 |
| P17 | 250 | 305 | | | | | | | | | | | | | | | 225 | 230 | | | | | | | | | | 505 |
| P18 | 200 | 505 | | | | | | | | | | | | | | | | 230 | 175 | | | | | | | | | 455 |
| P19 | 150 | 455 | | | | | | | | | | | | | | | | | 175 | 230 | | | | | | | | 405 |
| P20 | 150 | 405 | | | | | | | | | | | | | | | | | | 230 | 65 | | | | | | | 405 |
| P21 | 40 | 405 | | | | | | | | | | | | | | | | | | | 65 | 210 | | | | | | 295 |
| P22 | 20 | 295 | | | | | | | | | | | | | | | | | | | | 210 | 45 | | | | | 275 |
| P23 | 0 | 275 | | | | | | | | | | | | | | | | | | | | | 45 | | | | | 255 |
| P24 | 27.5 | 255 | | | | | | | | | | | | | | | | | | | | | | 237.5 | | | | 282.5 |
| P25 | 55 | 283 | | | | | | | | | | | | | | | | | | | | | | 237.5 | 72.5 | | | 310 |
| P26 | 55 | 310 | | | | | | | | | | | | | | | | | | | | | | | 72.5 | 237.5 | | 310 |
| P27 | 255 | 310 | | | | | | | | | | | | | | | | | | | | | | | | 237.5 | 272.5 | 510 |
| P28 | 227.5 | 510 | | | | | | | | | | | | | | | | | | | | | | | | | 272.5 | 272.5 |
| P29 | 455 | | | | | | | | | | | | | | | | | | | | | | | | | | | 272.5 |

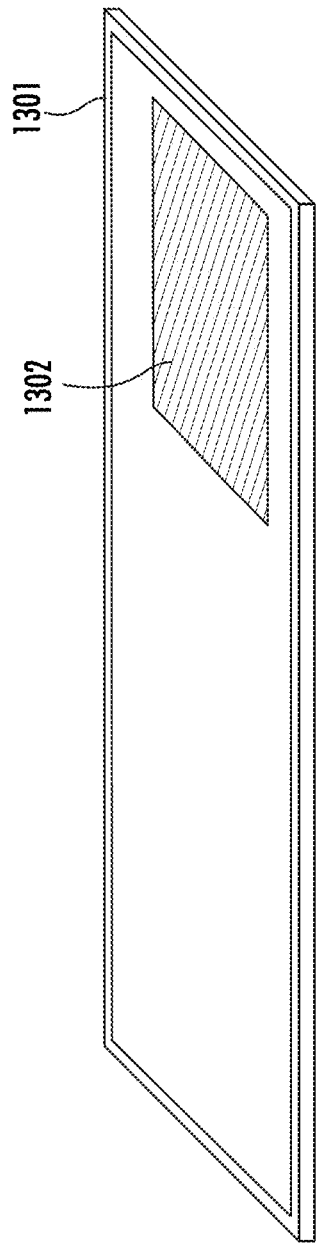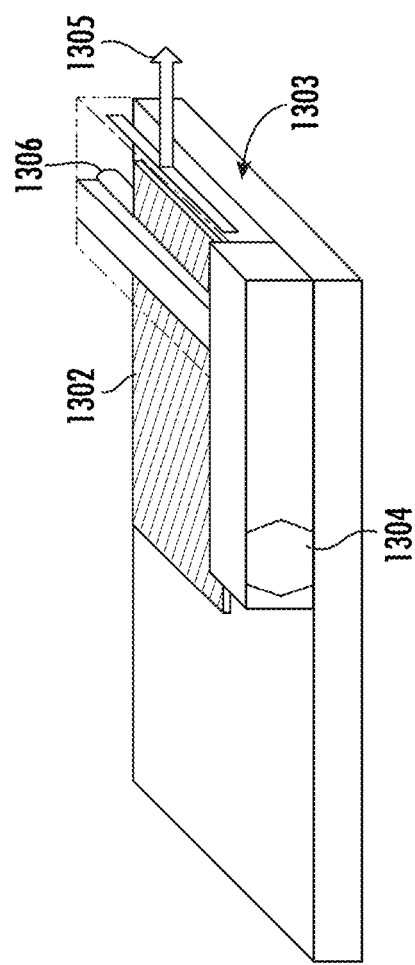
FIG. 13A
FIG. 13B

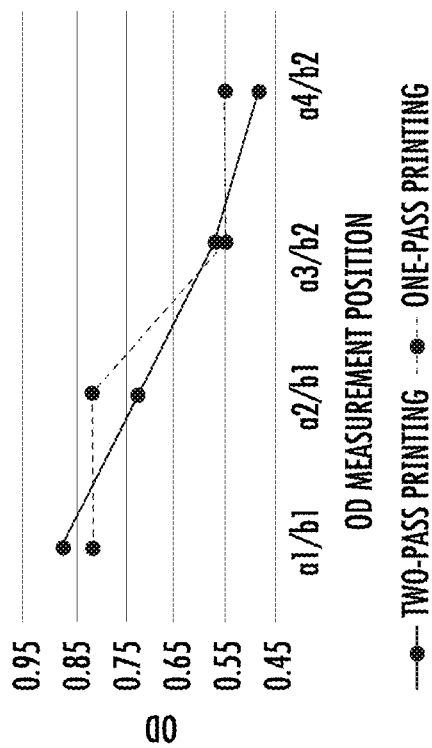
FIG. 16C
FIG. 16B
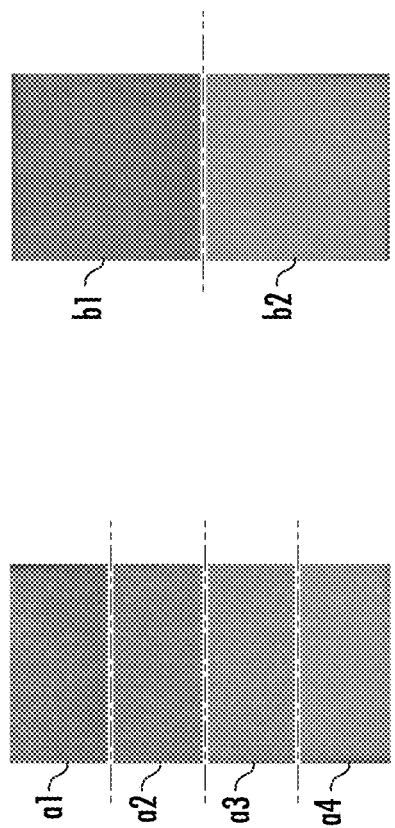
FIG. 16A

METHOD FOR ENHANCING PRINTING RESOLUTION FOR PHOTOSENSITIVE IMAGING SYSTEMS

FIELD

The present technology relates generally to a method for enhancing the resolution of an optical printer. More particularly, the present technology relates to a method for enhancing the resolution of an optical printer in the sub-scan direction by applying a set of printing algorithms.

BACKGROUND

Portable compact optical printers may be equipped with, for example, a self-containing photosensitive image sheet or medium. In an optical printer, a photo-print head including an exposure element array is typically used to expose photosensitive medium to light of varying intensities and colors in order to form a latent image, which is subsequently developed to form a color image in situ on the medium.

SUMMARY

As semiconductor technologies have improved, the capture, storage, and wireless upload/download of ultra-high-resolution images (e.g., more than 10 mega-pixels) have become commonplace using various portable devices (e.g., smart phones, stand-alone digital cameras). In comparison, the advances in the resolution and image quality of printed images generated by portable printing devices have been comparatively slower.

The present disclosure sets forth exemplary non-limiting implementations that address the foregoing deficiencies. One embodiment relates to a method for enhancing resolution of a radiation sensitive microcapsule-based printer. The method comprises generating, by a controller, multiple subpixels in a sub-scan direction based on an image data set of an image to be printed on a photosensitive medium. The method further comprises mapping, by the controller, multiple grids onto the photosensitive medium, the multiple grids corresponding to the multiple subpixels. The method further comprises determining, by the controller, an exposure energy required for each grid of the multiple grids based on a corresponding subpixel of the multiple subpixels. The method further comprises allocating, by the controller, the exposure energy required for each grid into a first exposure level and a second exposure level. The method further comprises exposing, by the controller, each grid of the photosensitive medium to the corresponding first exposure level and the corresponding second exposure level sequentially as the photosensitive media passes through the radiation sensitive microcapsule-based printer in the sub-scan direction.

Another embodiment relates to a method for enhancing resolution of a radiation sensitive microcapsule-based printer. The method comprises generating, by a controller, multiple subpixels in a sub-scan direction based on an image data set of an image to be printed on a photosensitive medium. The method further comprises mapping, by the controller, multiple grids onto the photosensitive medium, the multiple grids corresponding to the multiple subpixels. The method further comprises determining, by the controller, an exposure energy required for each grid of the multiple grids based on a corresponding image subpixel of the multiple subpixels. The method further comprises allocating, by the controller, the exposure energy required for each grid into a set of sub-energy exposure levels, wherein a number of sub-energy exposure levels in the set of sub-energy exposure levels is N. The method further comprises exposing, by the controller, each grid of the photosensitive medium to the corresponding set of sub-energy exposure levels sequentially as the photosensitive medium passes through the radiation sensitive microcapsule-based printer in the sub-scan direction.

Another embodiment relates to a radiation sensitive microcapsule-based printer comprising an exposure element array, a media transportation system, and a controller. The exposure element array includes a set of exposure elements. The media transportation system is configured to transport a photosensitive medium along a sub-scan direction. The controller includes a processor and a memory having instructions stored thereon. The instructions, when executed by the processor, cause the processor to generate multiple subpixels in the sub-scan direction based on an image data set of an image to be printed on the photosensitive medium. The instructions, when executed by the processor, further cause the processor to map multiple grids onto the photosensitive medium, the multiple grids corresponding to the multiple subpixels. The instructions, when executed by the processor, further cause the processor to determine an exposure energy required for each grid of the multiple grids based on a corresponding subpixel of the multiple subpixels. The instructions, when executed by the processor, further cause the processor to allocate the exposure energy required for each grid into a first exposure level and a second exposure level. The instructions, when executed by the processor, further cause the processor to expose each grid of the photosensitive medium to the corresponding first exposure level and the corresponding second exposure level sequentially as the photosensitive medium passes through the radiation sensitive microcapsule-based printer in the sub-scan direction.

BRIEF DESCRIPTION OF THE DRAWINGS

Further features, characteristics, and advantages of the present disclosure will become apparent to a person of ordinary skill in the art from the following detailed description of embodiments of the present disclosure, made with reference to the drawings annexed, in which like reference characters refer to like elements.

FIG. 6 is a table depicting a two-pass printing procedure for a random image data set, according to an example embodiment.

FIG. 7 is a table depicting a two-pass printing procedure for a random image data set with a first subpixel set to zero, according to an example embodiment.

FIG. 8 is a table depicting another two-pass printing procedure for a random image data set employing a nearest neighbor exception, according to an example embodiment.

FIG. 10 is a table depicting another two-pass printing procedure for a random image data set employing a nearest neighbor exception and an exposure energy level offset, according to an example embodiment.

FIG. 11 is a table depicting another two-pass printing procedure for a random image data set employing a nearest neighbor exception, an exposure energy level offset, and a first subpixel adjustment, according to an example embodiment.

FIG. 13A is a perspective view of an experimental arrangement having an OLED panel for exposing a media sheet, according to an example embodiment.

FIG. 13B is a perspective view of another experimental arrangement having a development fixture for developing an image on a media sheet, according to an example embodiment.

FIG. 16A is an image of another media sheet after a two-pass printing operation, according to an example embodiment.

FIG. 16B is an image of another media sheet after another one-pass printing operation, according to an example embodiment.

FIG. 16C is a chart showing various optical density (OD) value measurements associated with the images of FIGS. 16A and 16B, according to an example embodiment.

DETAILED DESCRIPTION

Figure 1:
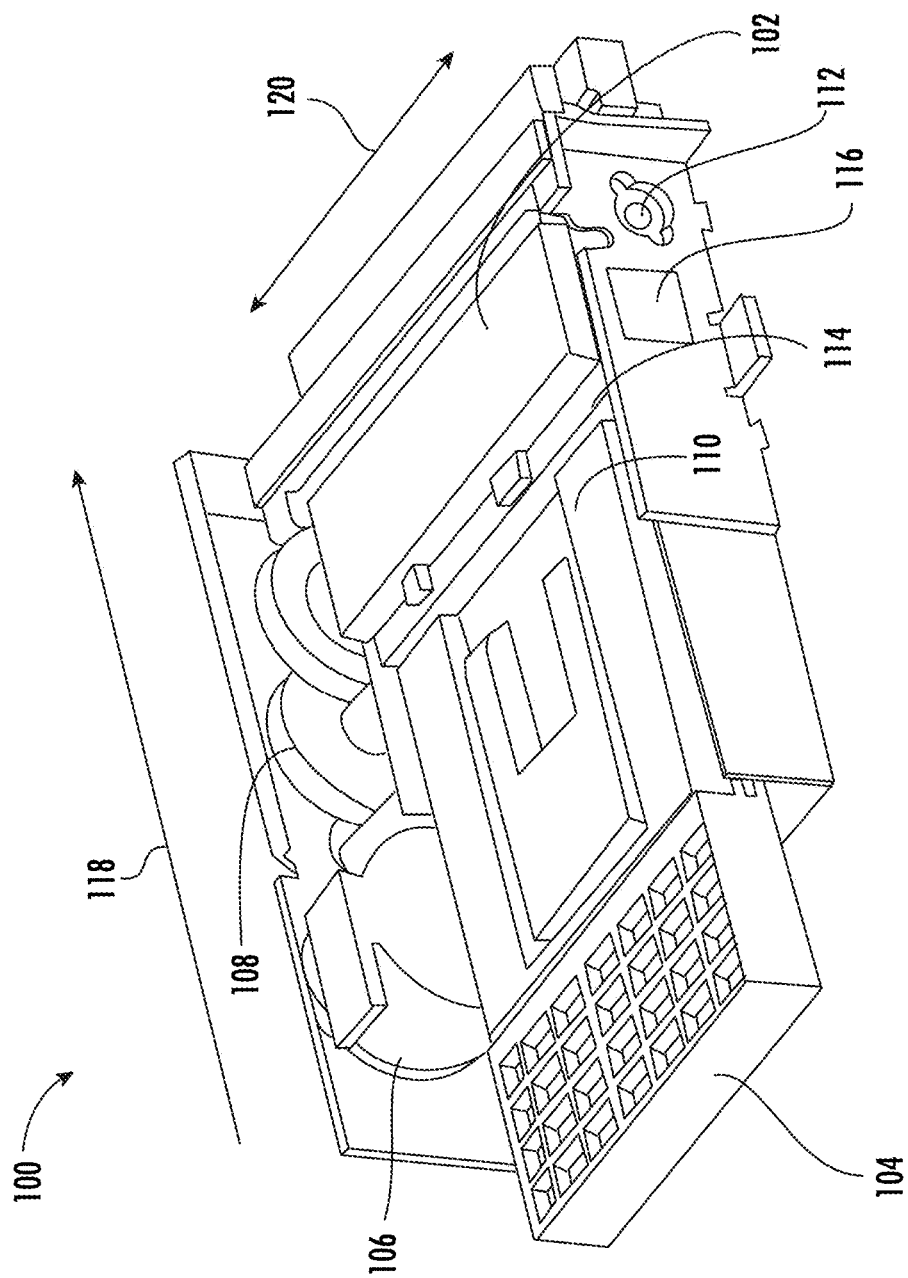
FIG. 1 is a perspective view of an optical printer, according to an example embodiment.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

The following terms are used throughout and are as defined below.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The embodiments illustratively described herein may suitably be practiced in the absence of any element or elements, limitation or limitations, not specifically disclosed herein. Thus, for example, the terms "comprising," "including," "containing," etc., shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. The expression "comprising" means "including, but not limited to."

Unless otherwise indicated, all numbers expressing quantities of properties, parameters, conditions, and so forth, used in the specification and claims are to be understood as being modified in all instances by the term "about." Accordingly, unless indicated to the contrary, the numerical parameters set forth in the following specification and attached claims are approximations. Any numerical parameter should at least be construed in light of the number reported significant digits and by applying ordinary rounding techniques. The term "about" when used before a numerical designation, e.g., temperature, time, amount, and concentration including range, indicates approximations which may vary by (+) or (−) 10%, 5% or 1%.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

Further, certain terms are used throughout the description and following claims to refer to particular components. As one skilled in the art will appreciate, hardware manufacturers may refer to a component by different names.

The present disclosure provides methods for enhancing the resolution of an optical printer. In general, achieving a higher printing resolution has a variety of benefits. For example, a higher printing resolution provides printed images that show finer detail with a better modulation transfer function (MTF). Further, a higher printing resolution allows for the gradient area image to have a smoother performance due to a smaller quantization error.

Traditionally, the maximum printing resolution for optical printers has been limited by the physical dimension of the individual exposure elements on the print head (e.g., an LED chip on the print head). For example, if each exposure element is 100 μm×100 μm, the maximum resolution has traditionally been limited to 254×254 DPI, which is a superior resolution achievable under conditions where the dot gain is equal to 1. The dot gain is generally defined as the minimum dot size achievable on the photosensitive medium divided by the actual exposure element dimension. However, the dot gain is typically larger than 1. Thus, the printing resolution is usually further deteriorated due to the minimum dot size being larger than the exposure element dimension.

Most commercial optical printers are page-wide type optical printers including a print head having an exposure element array comprising a set of exposure elements extending in the main scan direction and spanning the entire width of a photosensitive medium on which to be printed. Depending on different mechanical architectures, the exposure process is performed either by transporting the medium to pass through the exposure element array or by moving the exposure element array to traverse the entire medium. With page-wide type optical printers, the exposure element array does not move in the main scan direction (i.e., perpendicular to the sub-scan direction), such that there is no chance of increasing the main scan direction resolution.

However, the methods of the present disclosure allow for the enhancement of the resolution in the sub-scan direction, which is defined as the direction that the exposure element array is scanned across the media (either by transporting the media to pass through the exposure element array or by moving the exposure element array to traverse the media). Specifically, the methods described herein utilize various multi-pass printing algorithms to create an enhanced sub-pixel grid having individual subpixels that can be smaller than the physical dimension of the individual exposure elements within the exposure element array. Accordingly, the methods provided herein allow for the sub-scan direction resolution of the printed image to be increased by effectively breaking the traditional limitation of the exposure element physical dimension.

Additionally, the methods described herein effectively preserve sharp edge image information while performing the resolution enhancement, such that the image sharpness and fine features are retained after the enhancement. Further, the methods described herein can be performed without necessitating structural changes to various existing optical printers, and thus do not introduce any cost increases.

Although the methods described herein relate to improving the resolution in the sub-scan direction, it should be appreciated that, in non-page-wide type optical printers (e.g., optical printers having traversing scan heads), similar methods may be implemented to increase the main scan direction resolution.

FIG. 1 is a perspective view of an optical printer 100, according to an example embodiment of the present disclosure. In some instances, the optical printer 100 is a radiation sensitive microcapsule-based printer (e.g., a printer configured for utilization with a radiation sensitive microcapsule system). The optical printer 100 includes an exposure element array 102 (also referred to as a "photo-print-head"), a media cassette 104, a media transportation system (e.g., a transporter such as a motor 106, gear train 108, a media roller 110, a developing roller 112), a media sensor 114, and a control unit (a controller) 116. The developing roller 112 is disposed behind the exposure element array 102.

It should be noted that the optical printer 100 illustrated in FIG. 1 includes only a subset of potential components that may be employed within an optical printer. However, the basic structure and possible components of optical printers are generally within the grasp of those skilled in the art, and it should be appreciated that the optical printer 100 may be adapted, as applicable, to include a variety of additional or alternative components and/or to implement the optical printer 100 with appropriate devices or equipment.

In some embodiments, the control unit 116 includes a processor and a memory having instructions stored thereon that, when executed by the processor, cause the processor (and thus the control unit 116) to perform any of the various processes described herein. For example, in some embodiments, the control unit 116 is configured to control the various components of the optical printer 100 to perform printing processes for printing an image onto a photosensitive medium dispensed from within the media cassette 104 (e.g., via the media transportation system). The media cassette 104 is configured to store the photosensitive media until it is utilized in a printing process. The media cassette 104 is further configured to prevent the photosensitive medium from being exposed to leaked light while the photosensitive medium is held within the media cassette 104.

In accordance with the present disclosure, the control unit 116 may be programmable to carry out printing according to various printing processes. For example, in some instances, the control unit 116 may be programmable to carry out a first printing process or a second printing process. During the first printing process, the control unit 116 carries out so-called one-pass printing. The control unit 116 controls the media transportation system to pick up a medium (e.g., film, such as an instant film) using the media roller 110 and to transport the medium along a sub-scan direction 118 (which may be a direction in which media is transported) toward a media exit proximate the media sensor 114. The media sensor 114 (e.g., a photo interrupter sensor) is configured to detect the medium and, when a leading edge of the medium reaches the media sensor 114, the media sensor 114 detects the medium and the control unit 116 begins an exposure timer counter. Once the exposure timer counter value reaches a preset value (e.g., based on a speed of media advancement and a dimension of the exposure elements within the exposure element array 102), the leading edge of the medium will be directly below the exposure element array 102, and the control unit 116 will start the line exposure immediately. The exposure element array 102 spans the entire width of the medium (e.g., along a main scan direction 120), such that the exposure element array 102 is configured to expose a full width line of dots on the photosensitive medium simultaneously. Accordingly, as the medium continues to advance out of the media exit at a constant speed, the control unit 116 continues to trigger the line exposures at a fixed time interval until the whole image is formed on the photosensitive medium.

In the first printing process described above, the resolution of the print out (i.e., the image on the photosensitive medium) is dependent on the physical dimension of the exposure elements of the exposure element array 102. That is, the dot size marked on the photosensitive medium by each exposure element is equal to or larger than the size of the exposure element itself. Thus, the print out resolution is limited to this constrained dot size. As described below, in lieu of the first printing process, the control unit 116 may be configured to carry out a second printing process which differs from the first printing process. The terms "first" and "second" used herein are intended to connote different printing processes and not a sequential order.

Figure 2:
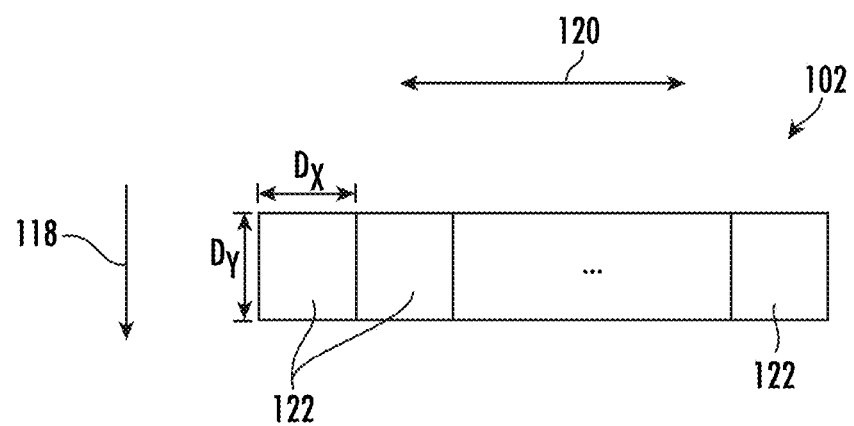
FIG. 2 is a schematic diagram of an exposure element array, according to an example embodiment.

For example, FIG. 2 is a schematic diagram of the exposure element array 102 comprising a set of exposure elements 122, according to an example embodiment of the present disclosure. In some instances, the exposure elements 122 may, for example, be light emitting diodes configured to emit light. In some other instances, various other types of exposure elements may be utilized, as desired for a given application. As shown, the dimensions of the exposure elements may be defined as $D_x \times D_y$, where $D_x$ is the length along the main scan direction 120 and $D_y$ is the length along the sub-scan direction (e.g., the sub-scan direction 118). In this scenario, when the exposure time interval (t) is equal to the time required for the photosensitive medium to advance a distance equal to $D_y$, the exposure element array 102 will not repeatedly expose each of the set of pixels of the photosensitive medium. In other words, each pixel of the photosensitive medium may only be exposed once. Hence, the aforementioned first process corresponds to one-pass printing.

However, instead of setting the exposure time interval to be equal to the time required for the photosensitive medium to advance a distance equal to $D_y$, the control unit 116 may be configured to carry out a second printing process differing from the aforementioned first printing process. For example, the control unit 116 may be configured to set the exposure time interval to be equal to the time required for the photosensitive medium to advance a distance equal to $D_y/N$ and similarly trigger the exposure element array 102 to expose the photosensitive medium at every exposure interval, as described below. Accordingly, each of a plurality of grids on the photosensitive medium is exposed N times. This second printing process may be referred to as multi-pass printing.

Figure 3:
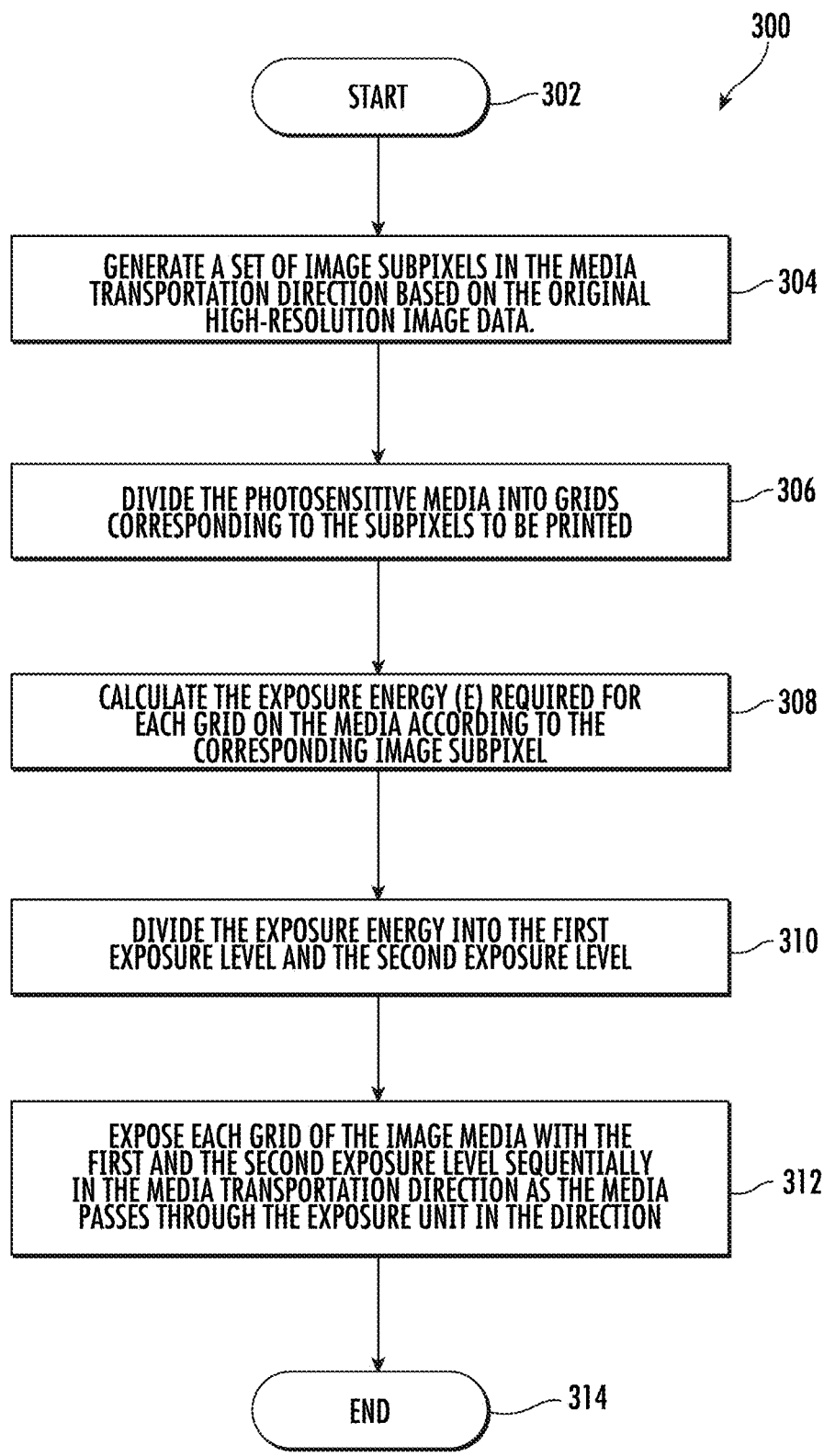
FIG. 3 is a flowchart of a method of printing using an optical printer, according to an example embodiment.
Figure 4:
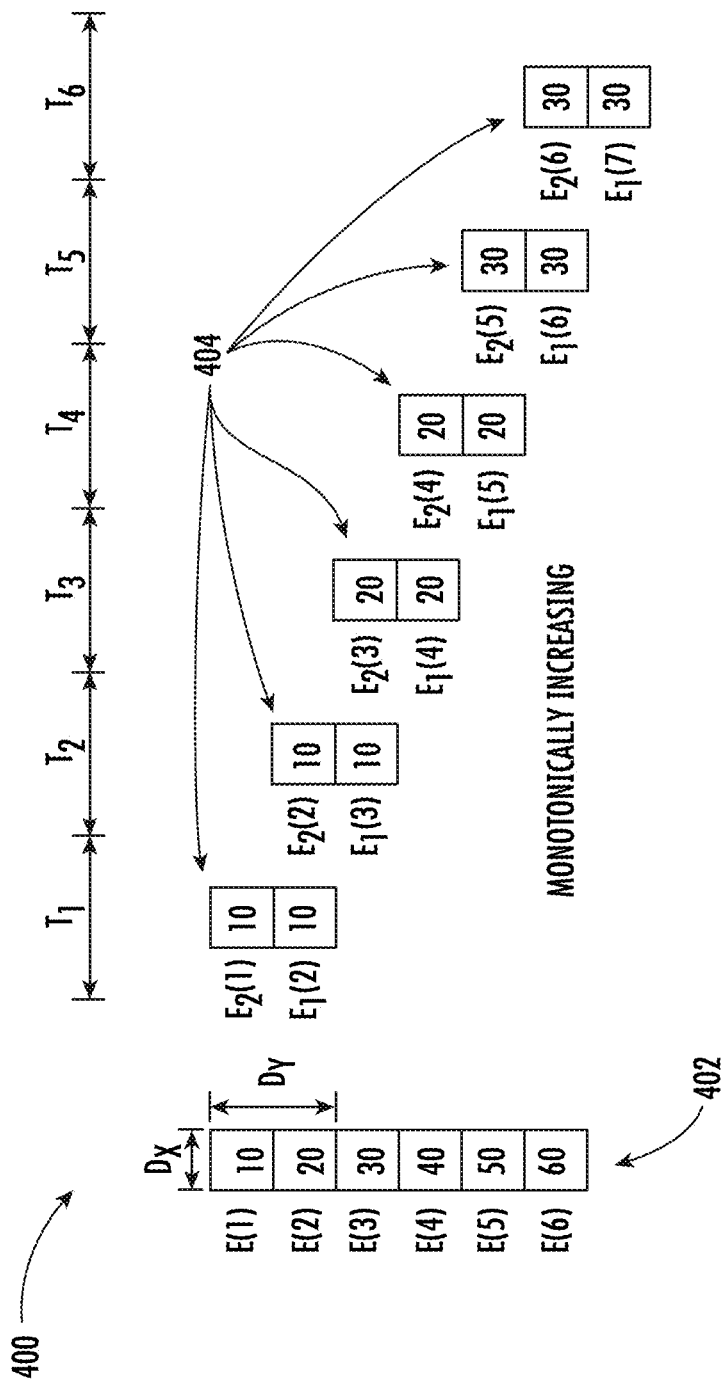
FIG. 4 is a schematic diagram of a two-pass printing procedure, according to an example embodiment.

For example, FIG. 3 shows a method 300 of a multi-pass printing operation that is a two-pass printing procedure (N=2). The method 300 effectively enhances the resolution of an optical printer (e.g., the optical printer 100) in the sub-scan direction 118, according to an example embodiment. Likewise, FIG. 4 provides an example schematic diagram 400 of the two-pass printing procedure for an overly simplified set of six consecutive image subpixels 402 in a single column (i.e., a stack extending along the sub-scan direction 118 to be created by the same exposure element 122), according to an example embodiment. Although only the exposure sequence 404 of a single exposure element 122 of the exposure element array 102 is shown in FIG. 4, it should be appreciated that a similar exposure sequence is applied by the rest of the exposure elements 122 of the exposure element array 102 simultaneously, such that the photosensitive medium is exposed to light in a line-by-line manner to effectively create the printed image. Further, it should be appreciated that $D_x$ and $D_y$ are not drawn to scale in FIG. 4, and are instead included to show that $D_x$ spans the width of one subpixel, while $D_y$ spans two consecutive subpixels.

It should also be appreciated that, in practice, the number of image subpixels may be as high as DPI×L×F in each column extending along the sub-scan direction 118 (i.e., corresponding to each individual exposure element 122), where DPI, L, and F are the number of dots per inch achievable by the print head (e.g., by the exposure element array 102), the length (in inches) of the image medium to be printed in the sub-scan direction 118, and the upscale factor, respectively. For example, using a 300 DPI-capable print head, an image medium of 3" length in the sub-scan direction 118, and an upscale factor of 2, the number of image subpixels to be generated for each column would be 1800 (i.e., 300×3×2=1800).

As illustrated in FIG. 2, the physical dimension of the exposure element is $D_x \times D_y$. However, in the two-pass printing procedure of FIGS. 3 and 4, the sub-scan resolution is enhanced by the factor of 2, so the size of an enhanced subpixel is $D_x \times D_y/2$. The value in each subpixel 402 shown in FIG. 4 denotes the required exposure energy (expressed as an 8-bit value in the range of 0 to 255).

With reference again to FIG. 3, the method 300 starts, at step 302, and the control unit 116 is configured to generate a set of image subpixels in the sub-scan direction 118 based on high-resolution image data, at step 304. For example, to print a high-resolution image captured by a high-resolution device (e.g., a greater than 10 megapixel digital camera or smart phone), the control unit 116 first down-scales the original image data to a set of image data of a proper scale according to a down-scale ratio of the optical printer 100, and then up-samples the set of down-scaled image data to generate the set of image subpixels in the sub-scan direction 118. The down-scale ratio is based on a printing resolution of the optical printer 100. In some instances, the printing resolution of the optical printer 100 may be determined based on a spot size of the exposure elements 122 in the exposure element array 102 (e.g., based on the dimensions of the exposure elements 122).

Once the set of image subpixels has been generated, the control unit 116 then divides the photosensitive medium into grids corresponding to the subpixels generated in the sub-scan direction 118 to be printed, at step 306. That is, the control unit 116 maps each image subpixel to be printed during the printing process to a corresponding grid on the photosensitive medium so as to determine a division. For example, in the illustrated example provided in FIG. 4, the number of the grids and the dimension of each of the grids are similarly 6 and $D_x \times D_y/2$, respectively.

The control unit 116 then calculates an exposure energy level (E) required for each grid on the medium according to the corresponding image subpixel, at step 308. For example, the control unit 116 calculates the exposure energy level (E) to be exposed on each of the grids of the medium based on the spectrum sensitivity of the medium to be printed on and according to the set of up-sampled image subpixels of the down-scaled image data. For example, the corresponding exposure element may expose the first grid with the exposure energy level denoted as E(1) in FIG. 4, wherein E(1) in the particular example illustrated is 10. Similarly, the exposure element may expose the second through sixth grids with the exposure energy levels denoted as E(2)-E(6), respectively. In the particular example provided in FIG. 4, E(2)-E(6) are 20, 30, 40, 50, and 60, respectively.

Once the exposure energy (E) required for each grid has been calculated, the control unit 116 then divides the exposure energy for each grid into a first exposure level and a second exposure level, at step 310. For example, as shown in FIG. 4, the exposure energy level E(1) for the first grid (corresponding to the first subpixel 402) is divided into exposure energy levels $E_1(1)$ and $E_2(1)$. Similarly, the exposure energy level E(2) for the second grid (corresponding to the second subpixel 402) is divided into exposure energy levels $E_1(2)$ and $E_2(2)$, and so on. In detail, in a first exposure interval $T_1$, the exposure element 122 exposes the first grid and the second grid to light with exposure energy levels $E_2(1)$ and $E_1(2)$ simultaneously. Therefore, exposure energy level $E_2(1)$ is equal to exposure energy level $E_1(2)$. Similarly, in a second exposure interval $T_2$, the exposure element 122 exposes the second grid and the third grid to light with exposure energy levels $E_2(2)$ and $E_1(3)$ simultaneously. Therefore, exposure energy level $E_2(2)$ is equal to exposure energy level $E_1(3)$. As will be appreciated, this pattern of simultaneous exposure continues for each pair of overlapping grids, as shown in FIG. 4. Additionally, a dummy exposure energy level may be set to zero for the first exposure energy level for the first grid (i.e., $E_1(1)$ is equal to zero).

Once the exposure energy for each grid has been divided, the control unit 116 then controls the optical printer 100 to advance the medium and expose each grid of the medium to light with the corresponding first and second exposure levels sequentially in the sub-scan direction 118 as the medium passes through the exposure element array 102, at step 312. For example, as discussed above, the dimensions of each exposure element 122 are $D_x \times D_y$. Accordingly, in the two-pass printing procedure, the control unit 116 sets the exposure time interval equal to the time required for the photosensitive medium to advance a distance equal to $D_y/2$ and triggers the exposure element array 102 to expose the photosensitive medium to light at the appropriate exposure energy light at every exposure interval.

For example, as shown in FIG. 4, the first grid (corresponding to the first subpixel 402) is sequentially exposed with $E_1(1)$ and $E_2(1)$, the second grid (corresponding to the second subpixel 402) is sequentially exposed with $E_1(2)$ and $E_2(2)$ and so on. In summary, the relationship between the exposure energy level, the first exposure energy level, and the second exposure energy level may be constrained to equations (1) and (2) below:

$$E(i)=E_1(i)+E_2(i) \quad (1)$$

$$E_2(i)=E_1(i+1) \quad (2)$$

wherein E(i) is the exposure energy level for the i-th grid, $E_1(i)$ is the first exposure energy level for the i-th grid and $E_2(i)$ is the second exposure energy level for the i-th grid. In the example schematic diagram 400 provided in FIG. 4, the exposure values of the image are monotonically increasing, such that equation constraints (1) and (2) discussed above can be fulfilled. However, as will be discussed below, in some instances, various exceptions may be implemented to avoid impractical or infeasible exposure requirements.

Referring again to FIG. 3, once the entire medium has passed through the exposure element array 102 and the image has been fully-formed, the method 300 ends, at step 314. It should be appreciated that, in the two-pass printing process, each grid of the photosensitive medium is exposed to light twice, which allows for each grid to have a smaller dimension in the sub-scan direction 118 than the corresponding exposure element 122, thereby effectively enhancing the image resolution, particularly the image gray level in the sub-scan direction 118.

Figure 5A:
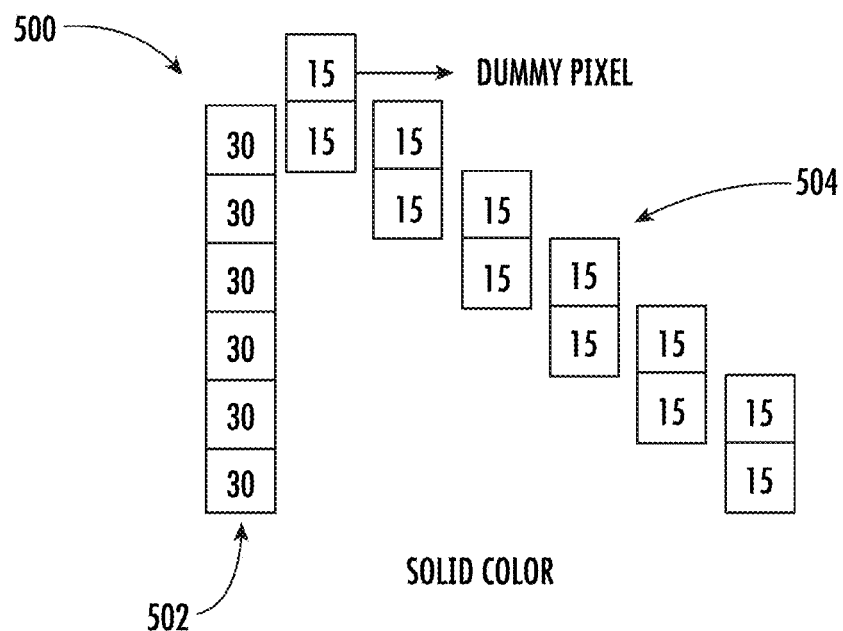
FIGS. 5A, 5B, and 5C are various schematic diagrams of two-pass printing procedures, according to example embodiments.
Figure 5B:
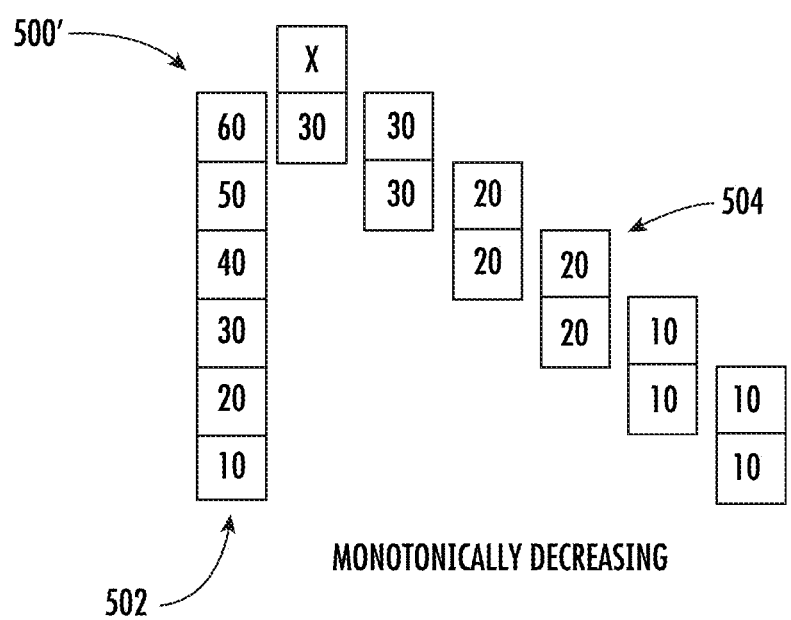
Figure 5C:
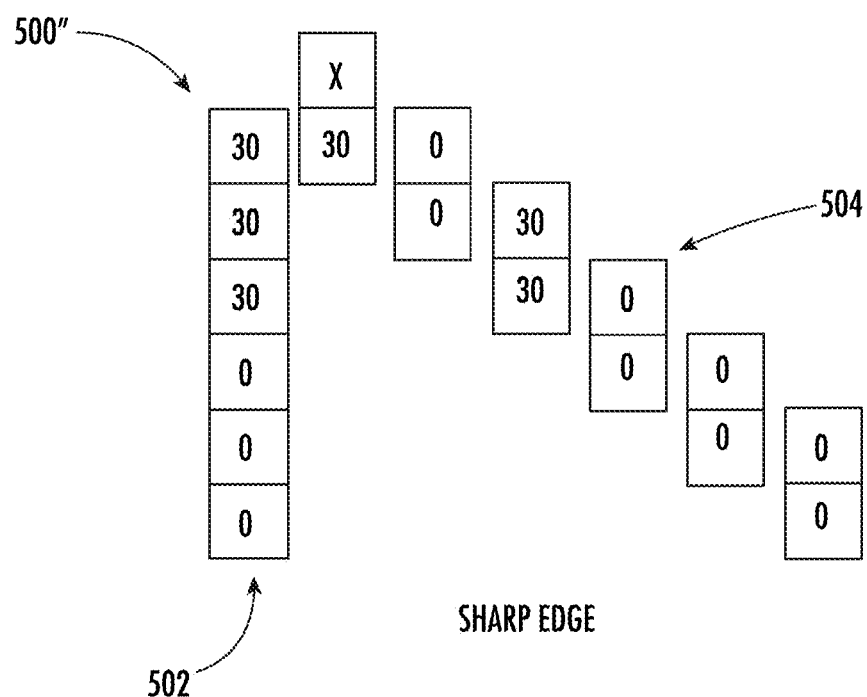

Referring now to FIGS. 5A-5C, various additional example schematic diagrams 500 (shown in FIG. 5A), 500' (shown in FIG. 5B), and 500" (shown in FIG. 5C) of the two-pass printing procedure discussed above in instances where, instead of the exposure values monotonically increasing, as shown in FIG. 4, the image data includes solid color (FIG. 5A), the exposure values are monotonically decreasing (FIG. 5B), and the image data includes a sharp edge (FIG. 5C). Each of FIGS. 5A-5C similarly includes a plurality of subpixels 502 and a corresponding exposure sequence 504. In some instances, as shown in FIG. 5A, in the case where the two-pass printing procedure is applied to a solid color area, at least one dummy pixel may be used to allow equation constraints (1) and (2) discussed above to be satisfied. However, because the at least one dummy pixel is outside the media boundary, it does not cause an issue with respect to printing. Similarly, in both FIGS. 5B and 5C, where the two-pass printing procedure is applied to an image requiring monotonically decreasing exposure values or including sharp edges, equation constraints (1) and (2) discussed above can similarly be satisfied.

Accordingly, the above examples (i.e., FIGS. 4-5C) show cases where equation constraints (1) and (2) can be met. However, in some instances, the image data may be more complex and less uniform than in the aforementioned examples. For example, the image data may instead be random. Random images generally contain a variety of high frequency components, which make meeting equation constraints (1) and (2) difficult or even impossible. To solve this problem, the exemplary methods described herein perform pre-processing on the image (e.g., down-scaling and up-sampling performed in step 304) to smooth out these high frequency components.

For example, in some instances, the user may use the optical printer 100 to print a high-resolution photo taken by an image capture device (e.g., a standalone digital camera, a camera integrated in a smart phone or image sensor array, etc.). Because the resolution of the optical printer 100 is generally much lower than the camera resolution, the image data of the high-resolution photos must be scaled down to a scaled image data for matching the photosensitive medium and the printer resolution. That is, the image data is scaled down from a first resolution (the high resolution) to a second resolution lower than the first resolution. The image data of a 16 mega-pixel photo is 4920×3264 pixels. If the printer resolution (without enhancement) is 300×300 DPI and the photosensitive medium size is 2 inches by 3 inches, the image data is scaled down to 600×900 pixels. If the two-pass printing procedure is applied, the printer resolution is enhanced to 300×600 DPI, and the image data may be up-sampled to 600×1800 pixels.

In this case, if the 16 mega-pixel image is scaled down to the final resolution of 600×1800 pixels directly for printing, the direct scale down operation will often lead to a "random" image with various high frequency components, which, as discussed above, cannot meet the two-pass printing equation constraints. However, instead of scaling down the image to the final resolution directly, the methods described herein first scale down the image using the unenhanced printer capability (i.e., 300×300 DPI) to create the scaled down image at 600×900 pixels and then perform the up-sampling in the sub-scan direction to reach the final resolution of 600×1800 pixels. As will be described below, the up-sampling may be performed using pixel interpolation, such that the up-sampled or added pixels are each the average of two corresponding neighboring pixels. By utilizing such pixel interpolation, the high frequency components can be effectively smoothed out.

FIG. 6 shows a table illustrating a two-pass printing procedure for interpolated random image data, according to an example embodiment of the present disclosure. As shown, the image subpixels are marked as P1-P21. The second column from the left is the exposure energy level to be applied to the corresponding grid on the photosensitive medium by each image subpixel. Each of the odd image subpixels (P1, P3, P5, etc.) have corresponding exposure energy levels that are the same as a set of the original image pixels. Each of the even image subpixels (P2, P4, P6, etc.) have corresponding exposure energy levels that are up-sampled through a linear interpolation procedure using the two adjacent image pixels. In other words, the exposure energy levels of the even subpixels are the average of the neighboring odd subpixels. For example, $E(P4)=(E(P3)+E(P5))/2$.

As discussed above, each exposure energy level is divided into a first exposure energy level and a second exposure energy level. For example, the exposure energy level $E(P1)$ for the first subpixel P1 is divided into exposure energy levels $E_1(P1)$ and $E_2(P1)$, the exposure energy level $E(P2)$ for the second subpixel P2 is divided into the first exposure energy levels $E_1(P2)$ and the second exposure energy $E_2(P2)$, and so on. As illustrated, $E_1(P1)$ is equal to 0 (not shown in FIG. 6), while $E_2(P1)$ is equal to 20, $E_1(P2)$ is equal to 20, $E_2(P2)$ is equal to 0, and so on. It should be appreciated that the first and second exposure energy levels for each subpixel are calculated such that the equation constraints (1) and (2) discussed above are fulfilled. However, as shown in FIG. 6, the second exposure energy level for P18 and the first exposure energy level for P19 are each negative. Accordingly, it may be desirable to utilize this procedure in conjunction with various other algorithms and strategies to avoid these negative exposure energy levels, as will be discussed below.

FIG. 7 shows a table illustrating a two-pass printing procedure for interpolated random image data, similar to that shown in FIG. 6, according to another example embodiment of the present disclosure. For example, the even image subpixels are similarly up-sampled through the linear interpolation procedure using the two adjacent image pixels. However, in the embodiment shown in FIG. 7, the exposure energy level $E(P1)$ of the first subpixel P1 is set to zero and all of the first exposure energy levels and the second exposure energy levels are not negative. Specifically, if the set of image pixels are up-sampled through the linear interpolation procedure to obtain the set of image subpixels and the first exposure energy level of the first image subpixel is set to zero, the first and second exposure energy levels of the set of image subpixels will be non-negative. That is, by both interpolating the image data and setting the first subpixel exposure energy level to zero, both equation constraints (1) and (2) will be met for any image data.

However, a side effect of interpolation is that it may lose important high frequency components of the original image (e.g., sharp edges). For example, in some instances, if a difference value between the exposure energy levels of two adjacent image pixels is larger than a threshold, this may be considered to be or otherwise indicative of a sharp edge. In some instances, this threshold may be defined as one third of a difference value between a maximum value of the exposure energy levels of the image pixels and a minimum value of the exposure energy levels of the image pixels. However, in other instances, the threshold may be defined in a variety of other manners.

Referring again to FIG. 7 and using the aforementioned threshold definition, there is a sharp edge between the image data related to pixels P9 and P11 from the original image. Specifically, the difference value between the exposure energy level $E(P11)$ of P11 and the exposure energy level $E(P9)$ P9 is 100 (i.e., 220−120). This value is larger than the threshold, which would be 73.33. That is, the threshold (i.e., 73.33) for the image date shown in FIG. 7 is one third of a difference between the maximum value (i.e., 220 in P11) and the minimum value (i.e., 0 in P1) of the exposure energy levels. Accordingly, in the original image, there was a sharp edge between the image data related to P9 and P11.

However, after performing the linear interpolation, the difference value between $E(P9)$ and $E(P10)$ or between $E(P10)$ and $E(P11)$ becomes 50 (i.e., 170−120 or 220−170), which are each lower than the threshold. Accordingly, the sharp edge no longer exists in the interpolated image data. In fact, it is generally infeasible for the two-pass printing method to preserve the sharp edge using interpolation alone, since the basic assumption of interpolation must be violated in order to preserve the sharp edge. One potential way to address the sharp edge issue would be to apply a sharpening filter to the image data prior to interpolation to help enhance the sharp edges within the image data. However, even in this case, the interpolation step will still smooth out the sharp edge and the MTF will be inferior as compared to the original non-interpolated image.

Accordingly, in some instances, in order to preserve sharp edges within the image data, the linear interpolation for any two adjacent image pixels having a sharp edge may be replaced with a nearest neighbor algorithm.

For example, FIG. 8 shows a table illustrating a two-pass printing procedure for interpolated random image data that retains sharp edges using the nearest neighbor algorithm, according to another example embodiment of the present disclosure. As illustrated, the odd subpixels in FIG. 8 are the same as the odd subpixels in FIG. 7. However, in FIG. 8, the nearest neighbor algorithm is performed using $E(P9)$ and $E(P11)$ to determine $E(P10)$. That is, $E(P10)$ is no longer $(E(P9)+E(P11))/2$, but is instead set equal to $E(P9)$. Accordingly, the difference value between $E(P10)$ and $E(P11)$ becomes 100 (e.g., 220−120), which is higher than the threshold. In other words, the sharp edge between the original P9 and P11 is retained between P10 and P11. However, as shown in FIG. 8, the second exposure energy level for P18 and the first exposure energy level for P19 are negative. Accordingly, it may similarly be desirable to utilize this combined procedure (i.e., combining the linear interpolation with the nearest neighbor exception) in conjunction with various other algorithms and strategies to avoid these negative exposure energy levels, as will be discussed below.

Figure 9:
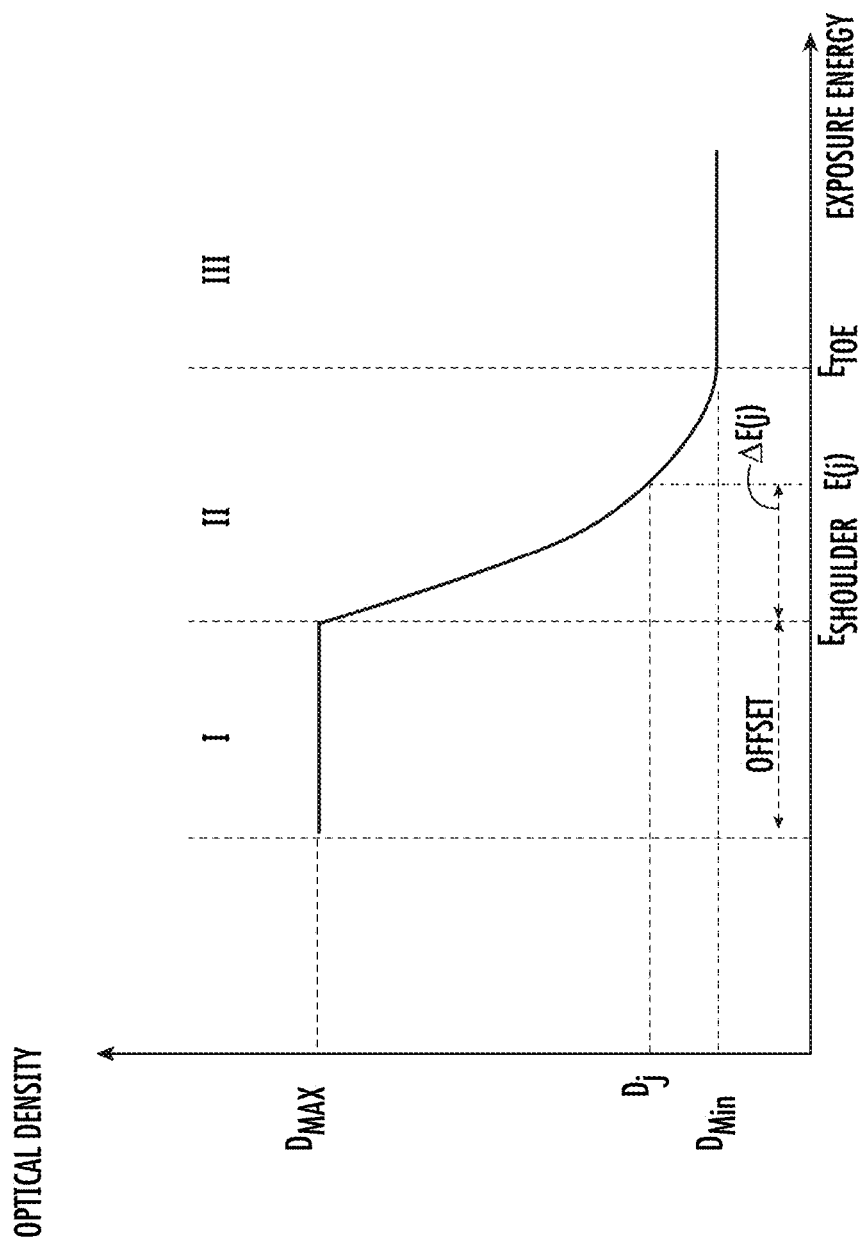
FIG. 9 is a chart depicting an ideal media characteristic of a photosensitive medium.

Referring now to FIG. 9, an ideal media characteristic of an optical density value (OD) to the exposure energy is shown, according to an example embodiment of the present disclosure. In some instances, the self-containing media utilized by the optical printer 100 (e.g., contained within the media cassette 104) is based on a light-sensitive microcapsule system, which is made by coating a substrate film with carbonless-type microcapsules that are a few microns in diameter. These microcapsules include discrete walls enclosing an internal phase composition of a monomer having a photosensitive initiator and a dye precursor. Exposure of the media sheet hardens the internal phase of the microcapsules and renders them resistant to rupture. Thus, a latent image is formed as an image-wide pattern of hard (exposed) and soft (unexposed) microcapsules. The visible image is developed physically by bringing the exposed sheet into contact with a receiver sheet under a uniform pressure, thereby causing only the soft microcapsules to rupture and to deliver leuco dye to the receiver sheet. The leuco dye then reacts with the coating on the receiver sheet to produce a visible image.

The chemical processes that lead to the latent image in a microencapsulated acrylate system (e.g., the light-sensitive microcapsule system discussed above) involve three distinct and consecutive mechanisms: (a) photoinitiation, in which free radicals are produced by the action of light; (b) autoxidation, in which the inhibition effect of oxygen, as is known in acrylate chemistry, is overcome; and (c) polymerization of the acrylate monomer to harden the internal phase of the microcapsules.

As shown in FIG. 9, in Zone I, the optical density (OD) value remain constant at $D_{max}$ as the exposure energy increases, while the exposure energy remains below $F_{shoulder}$. The OD value remains constant because, during the induction exposure, no detectable polymerization occurs until the oxygen concentration in the acrylate monomer is reduced to a few tenths of a percent of the equilibrium value. As such, there is no change in the OD value until the induction period is passed. Accordingly, if any exposure energy smaller than $E_{shoulder}$ is applied to a given grid on the photosensitive medium, the OD value of the grid will remain at $D_{max}$. On the other hand, in Zone III, since almost all the microcapsules within the gird have been polymerized, the OD value may remain constant at $D_{min}$ as the exposure energy decreases, while the exposure energy remains above $F_{toe}$. However, in Zone II, the OD value decreases as the exposure energy increases. Thus, for a given grid with the target OD value $D_j$, the required exposure energy can be expressed as the equation below:

$$E(j)=E_{shoulder}+\Delta E(j) \qquad (3)$$

wherein $E_{shoulder}$ is the energy level required for overcoming the inhibition effect of oxygen and passing the induction period and $\Delta E(j)$ is the energy level required for the given grid to reach the target OD value $(D_j)$.

In equation (3), $E_{shoulder}$ may be considered a barrier, and may thus be used as an offset. Specifically, when the photosensitive medium is exposed with an exposure energy within an offset range that is less than $E_{shoulder}$, the optical density on the grid of the photosensitive medium may be unchanged regardless of where the exposure energy falls within the offset range. Accordingly, this offset range characteristic may be utilized to resolve the edge retention issue shown in FIG. 8.

For example, FIG. 10 shows a table illustrating a two-pass printing procedure for interpolated random image data that retains sharp edges using the nearest neighbor algorithm and includes an exposure energy level offset, according to another example embodiment of the present disclosure. In FIG. 10, the second column from the left includes the original exposure energy levels for each of the image subpixels. The third column from the left includes the offset exposure energy levels, which are calculated by adding the exposure energy level offset (e.g., $E_{shoulder}$) to each of the original exposure energy levels. In some instances, as shown in FIG. 10, the exposure energy level offset may be set to a value of 255. However, in other instances, the exposure energy level may be set to a different value based on the media characteristics of the photosensitive medium used in the printing process.

As shown in FIG. 10, there are four sharp edges in the original image data: between P5 and P7, between P15 and P17, between P19 and P21, and between P25 and P27. However, when the nearest neighbor algorithm is performed to calculate the intermediate image subpixels, some first exposure energy levels and second exposure energy levels are negative. Accordingly, it may similarly be desirable to utilize this combined procedure (i.e., combining the linear interpolation, the nearest neighbor exception, and the exposure energy level offset) in conjunction with various other algorithms and strategies to avoid these negative exposure energy levels, as will be discussed below.

For example, in some instances, the control unit 116 may further adjust the exposure energy of the first image subpixel by a predetermined amount configured to prevent any of the first and/or second exposure energy levels from being negative. In some instances, the predetermined amount may be selected or determined to offset the most negative exposure energy level from the set of image subpixels.

For example, FIG. 11 shows a table illustrating a two-pass printing procedure for interpolated random image data, similar to FIG. 10, that further adjusts the exposure energy of the first image subpixel to prevent the negative exposure energy levels, according to another example embodiment of the present disclosure. As shown in FIG. 10, the most negative exposure energy level calculated was −95. Accordingly, in FIG. 11, the predetermined amount for the first subpixel exposure energy level to be adjusted by is set to 95 to offset the most negative exposure energy level that would have otherwise resulted. Because 95 is less than $E_{shoulder}$, the adjustment of the exposure energy in the first subpixel from 0 to 95 does not change the OD value.

In other words, by adjusting the exposure energy of the first image subpixel to offset the negative exposure energy levels (e.g., by setting it to 95), the two-pass printing procedure may be applied to any image, while retaining the sharp edges from the original image data. Specifically, when the exposure energy of the first image pixel is adjusted to offset the negative exposure energy levels (e.g., set to 95), all first and second exposure energy levels are positive or zero. In this manner, the exposure element 122 is configured to apply an appropriate set of first and second exposure energy levels to a corresponding set of grids on the photosensitive medium.

Accordingly, the two-pass printing method described herein is capable of effectively enhancing the resolution in the sub-scan direction 118, while also effectively retaining edge information from the original image data.

Figure 12:
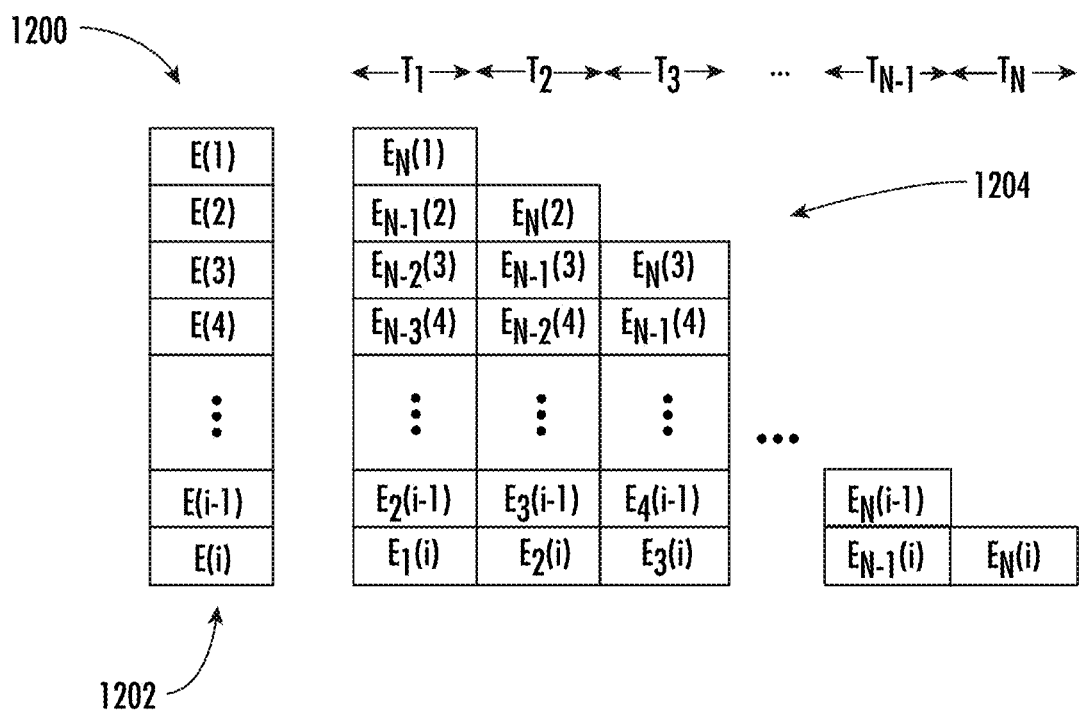
FIG. 12 is a schematic diagram of an N-pass printing procedure, according to an example embodiment.

It should be appreciated that, although the discussion above refers to a two-pass printing procedure, the method 300 may be adapted to further enhance the sub-scan direction resolution utilizing any number of additional "passes" in the printing procedure. For example, FIG. 12 provides an example schematic diagram 1200 of an N-pass printing procedure for a number (i) of image subpixels 1202, each having a corresponding exposure energy level (shown as E(1) through E(i)), undergoing an exposure sequence 1204, according to an example embodiment of the present disclosure. As shown in the N-pass printing procedure, the control unit 116 sets the exposure interval equal to the time required for the photosensitive medium to advance a distance equal to $D_y/N$ and similarly triggers the exposure element array 102 to expose the photosensitive medium every exposure interval (e.g., denoted sequentially by $T_1$ through $T_N$).

Accordingly, the subpixels 1202 and corresponding grid sections generated in the method 300 (e.g., steps 304 and 306) are each the length (in the sub-scan direction 118) of the exposure element (in the sub-scan direction 118) divided by N. As such, the sub-scan direction resolution is increased by a factor of N (i.e., the up-sampled image has N times as many subpixels in the sub-scan direction 118 as the number of image pixels in the scaled image) and each grid on the photosensitive medium is exposed N times.

It should be appreciated that the up-sampling (e.g., the interpolation procedure and nearest neighbor algorithm) discussed above, with reference to the two-pass print procedure, may similarly be applied to an N-pass print procedure. For example, the step of up-sampling the set of image pixels of the scaled image data set to generate the set of image subpixels in the sub-scan direction may similarly be performed using a linear interpolation to add (N−1) subpixels between each pair of adjacent image pixels.

As illustrated, during the exposure sequence 1204, the i-th grid is sequentially exposed with $E_1(i), E_2(i), \ldots,$ and $E_N(i)$. Further, although only $E_N(1)$ is shown in FIG. 12, it should be understood that the first grid may similarly be sequentially exposed with $E_1(1), E_2(1), \ldots$ and $E_N(1)$. In summary, the relationship between the exposure energy level, the first exposure energy level to the N-th exposure energy level may be expressed as equation (4) and equation (5):

$$E(i)_{total} = E_1(i) + E_2(i) + \ldots + E_N(i) \qquad (4)$$

$$E_N(i) = E_{N-1}(i+1) = \ldots = E_2(i+(N-2)) = E_1(i+(N-1)) \qquad (5)$$

wherein E(i) is the exposure energy level for the i-th grid and $E_N(i)$ is the N-th exposure energy level for the i-th grid.

The foregoing summarizes an example embodiment of a general algorithm and procedure of the present disclosure. In the following sections, example experiment results of the present disclosure will be described in some detail. These example experiment results are intended to demonstrate the feasibility of the present disclosure in accordance with the example embodiment of the general algorithm and procedure discussed above. Therefore, the detailed descriptions of these experiments are offered for illustrative purposes only, and they are not intended to limit the scope of the present disclosure.

FIGS. 13A and 13B show experimental setups associated with performing an example experiment in accordance with the algorithm and techniques described above, according to example embodiments of the present disclosure. For example, FIG. 13A illustrates an experimental setup having an OLED panel 1301 for exposing a media sheet 1302 and FIG. 13B illustrates an experimental setup having a development fixture 1303 for developing an image on the media sheet 1302.

As shown in FIG. 13A, during an example experiment, an OLED panel 1301 is used as an exposure device and the media sheet 1302 is placed on top of the OLED panel 1301. The OLED panel 1301 is then configured to apply an exposure to the media sheet 1302. After the exposure process is completed, the media sheet 1302 is brought to the development fixture 1303 (shown in FIG. 13B) to develop the image. For example, the media sheet 1302 is transported by a media feeding motor 1304 in a media exit direction 1305. The media sheet 1302 then passes through a pressure roller 1306, which provides uniform pressure to the media sheet 1302. The uniform pressure applied to the media sheet 1302 by the pressure roller 1306 causes only the soft microcapsules to rupture, thereby delivering the leuco dye and causing a visible image to develop on the media sheet 1302.

Referring now to FIGS. 14A-14H, various schematic diagrams depicting experiment processes and corresponding resulting grids for a two-pass printing method (shown in FIGS. 14A-14E) and a one-pass printing method (shown in FIGS. 14F-14H) are shown, according to example embodiments of the present disclosure. Using the setups and general example experiment process described above, an experimental result achieved by applying the two-pass printing method described above (e.g., shown in FIG. 14E) shows that the resolution and the color smoothness in the sub-scan direction is effectively enhanced by applying the two-pass printing method described herein, as compared to the experimental result achieved by applying a conventional one-pass printing method (e.g., shown in FIG. 14H).

To avoid light leakage from the ambient environment, the experiments for each of the two-pass and one-pass printing methods were performed in a dark room. The media sheets used for the experiments were monochrome and containing only magenta microcapsules. In each of the experiments, the exposure procedure was controlled by following certain timing to trigger the OLED panel 1301 to display specific display images. FIGS. 14A-14D and FIGS. 14F-14G show the display images which were displayed on the OLED panel 1301 for each of the two-pass printing method (shown in FIGS. 14A-14D) and the one-pass printing method (shown in FIGS. 14F-14G).

For the two-pass printing experiment, the display images shown in FIG. 14A-14D were displayed on the OLED panel 1301 sequentially to simulate the two-pass printing method media exposure process described herein. For example, the white square in each display image was used to simulate a single exposure element of an exposure element array. In accordance with the foregoing description of the two-pass printing method, because the dimension of the square (e.g., the simulated exposure element) was 2 cm×2 cm, the corresponding gird dimension for each resulting grid on the media sheet was 2 cm×1 cm.

Figure 14E:
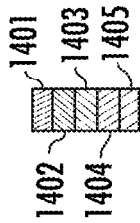
FIG. 14E is a schematic diagram of grids resulting from the example of FIGS. 14A, 14B, 14C, and 14D, according to an example embodiment.
Figure 14D:
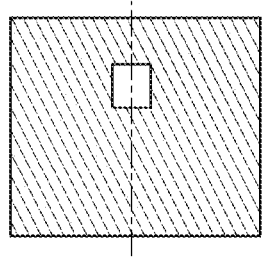
FIGS. 14A, 14B, 14C, and 14D are various schematic diagrams of images to be displayed on an OLED panel, which are used to expose a media sheet, according to an example embodiment.
Figure 14C:
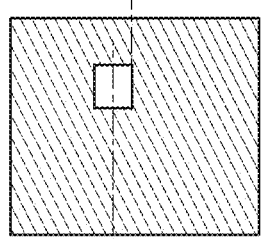
Figure 14B:
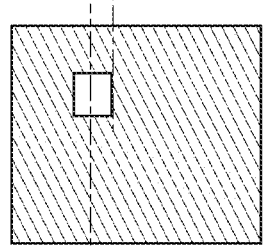
Figure 14A:
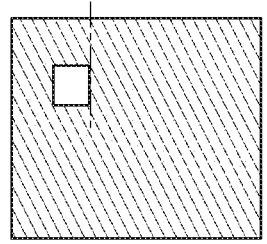

The exposure process of the two-pass printing experiment started by triggering the OLED panel 1301 to display the display image in FIG. 14A, which exposed the first two grids (e.g., grid 1401 and 1402 in FIG. 14E) on the media sheet 1302. After the first exposure finished, instead of moving the media sheet forward to the position where the second grid 1402 and the third grid 1403 would be exposed by the simulated exposure element (the white square), the OLED panel 1301 displayed the display image shown in FIG. 14B, in which the exposure element (the white square) is moved by a distance of half the square side length (e.g., 1 cm) to expose the second grid 1402 and the third grid 1403. Thus, by displaying the display images from FIG. 14A-14) sequentially, the experiment effectively resulted in five grids (e.g., grids 1401, 1402, 1403, 1404, 1405 shown in FIG. 14E) on the media sheet 1302 being exposed. It should be appreciated that, after the exposure process of the two-pass printing experiment shown in FIGS. 14A-14D was completed, the second grid 1402, the third grid 1403, and the fourth grid 1404 were each exposed twice, and the first grid 1401 and the fifth grid 1405 were each only exposed once.

Figure 14H:
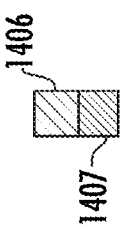
FIG. 14H is a schematic diagram of grids generated based on the example shown in FIGS. 14F and 14G, according to an example embodiment.
Figure 14G:
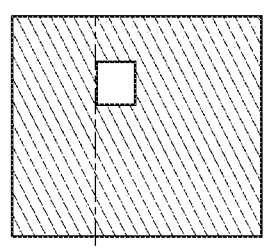
FIGS. 14F and 14G are schematic diagrams of images to be displayed on an OLED panel, which are used to expose a media sheet, according to an example embodiment.
Figure 14F:
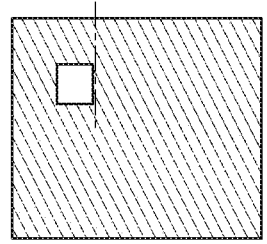

The exposure process of the one-pass printing experiment is shown in FIGS. 14F and 14G. For example, in the one-pass printing experiment, the display images shown in FIGS. 14F and 14G were displayed on the OLED panel 1301 sequentially. As illustrated, the white squares in these display images were similarly used to simulate a single exposure element of an exposure element array. However, because each grid is only exposed once in the one-pass printing method, as opposed to each grid being exposed twice in the two-pass printing method, the grid dimension in the one-pass printing experiment was equal to the simulated exposure element dimension (e.g., 2 cm×2 cm).

For example, the exposure process of the one-pass printing experiment started by triggering the OLED panel 1301 to display the display image shown in FIG. 14F to expose the media sheet 1302, which exposed the first grid 1406 shown in FIG. 14H. After the first exposure finished, the OLED panel 1301 displayed the display image in FIG. 14G, in which the exposure element (the white square) is moved by a distance of one square side length (e.g., 2 cm) to expose the second grid 1407. Thus, by displaying the display images shown in FIGS. 14F and 14G, the experiment effectively resulted in two grids (e.g., grids 1406, 1407 shown in FIG. 14H) on the media sheet 1302 being exposed. It should be appreciated that, after the exposure process of the one-pass printing experiment shown in FIGS. 14F and 14G, the first grid 1406 and the second grid 1407 are each exposed only once.

Figure 15C:
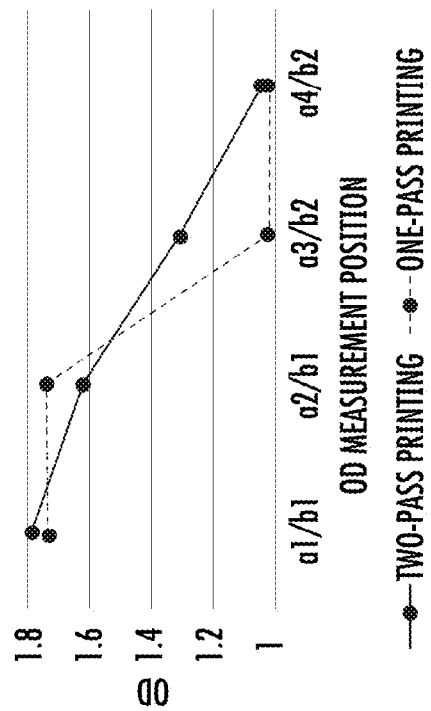
FIG. 15C is a chart showing various optical density (OD) value measurements associated with the images of FIGS. 15A and 15B, according to an example embodiment.
Figure 15B:
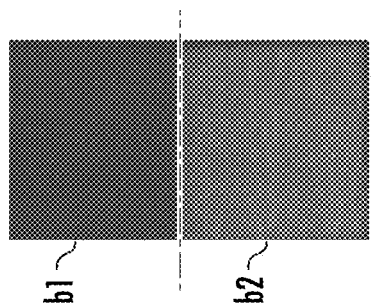
FIG. 15B is an image of a media sheet after a one-pass printing operation, according to an example embodiment.
Figure 15A:
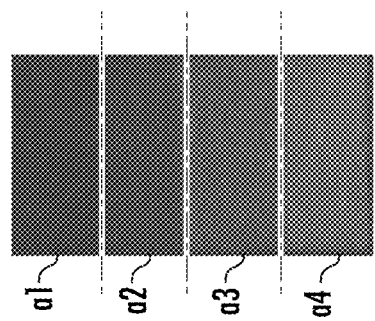
FIG. 15A is an image of a media sheet after a two-pass printing operation, according to an example embodiment.

FIGS. 15A-15C show example experiment images and corresponding experiment result data from a two-pass printing experiment and a one-pass printing experiment, similar to those discussed above, with respect to FIGS. 14A-14H. For example, FIG. 15A is an image of a media sheet after applying a two-pass printing experiment. Specifically, the display images shown in FIGS. 14A-14D were sequentially used to expose the media sheet shown in FIG. 15A. Since the brightness of the white squares in FIG. 14A-14D are all equal, the exposure energy levels are proportional to the displaying time durations of these display images. The displaying time durations for these display images were set as shown below:

Image shown in FIG. 14A: 1 second;
Image shown in FIG. 14B: 1 second;
Image shown in FIG. 14C: 2 seconds;
Image shown in FIG. 14D: 2 seconds.

In FIG. 15A, the grid boundaries between adjacent grids are marked by dotted lines. While, according to the foregoing description, 5 grids on the media sheet are exposed through the aforementioned exposure process, only 4 grids (marked as a1, a2, a3, and a4) are shown in FIG. 15A. It will be appreciated that these 4 grids generally correspond to the grids 1401-1404 shown in FIG. 14E. As described herein, for two-pass printing, the total exposure time, which is proportional to the total exposure energy level of each grid, is the sum of the first exposure time and the second exposure time. Thus, the exposure times of grids a1-a4 were as follows:

Grid a1: 1 second (1 second plus 0 seconds);
Grid a2: 2 seconds (1 second plus 1 second);
Grid a3: 3 seconds (1 second plus 2 seconds);
Grid a4: 4 seconds (2 seconds plus 2 seconds).

FIG. 15B shows an image of a media sheet after applying the one-pass printing method Specifically, the display images shown in FIG. 14F and FIG. 14G were sequentially used to expose the media sheet shown in FIG. 15B. The displaying time durations for these two images were set as shown below:

Image shown in FIG. 14F: 1 second;
Image shown in FIG. 14G: 4 seconds.

In FIG. 15B, the grid boundary between adjacent grids is similarly marked by a dotted line. As illustrated, there are only 2 grids (marked as b1 and b2) are shown on the media sheet in FIG. 15B. It will be appreciated that these 2 grids generally correspond to the grids 1406, 1407 shown in FIG. 14H. As described herein, for one-pass printing, the total exposure time of each grid is equal to the time duration of the OLE) panel 1301 displaying the corresponding display image. Thus, the exposure times of grid b1 and grid b2 were 1 second and 4 seconds, respectively.

FIG. 15C is a chart showing the OD value measurement of each grid on both of the media sheets shown in FIGS. 15A and 15B. As illustrated, the OD value transition of the two-pass printing was smoother than that of the one-pass printing. Specifically, because the grid size of the two-pass printing experiment was only half of the grid size of the one-pass printing experiment, the resolution of the media sheet from the two-pass printing experiment was twice that of the media sheet from the one-pass printing experiment.

Figures 17A, 17B, 17C:
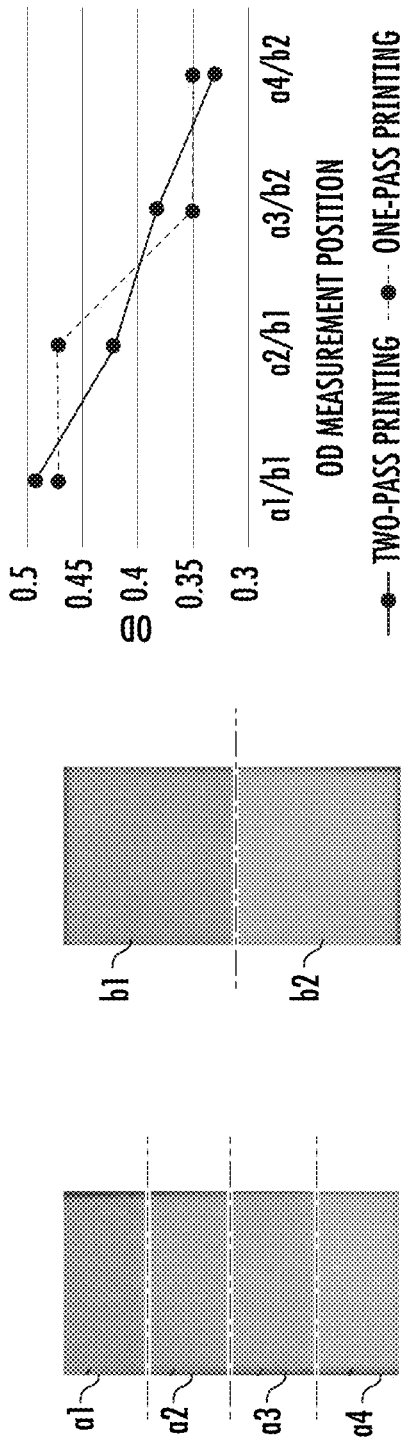
FIG. 17A is an image of another media sheet after another two-pass printing operation, according to an example embodiment.
FIG. 17B is an image of another media sheet after another one-pass printing operation, according to an example embodiment.
FIG. 17C is a chart showing various optical density (OD) value measurements associated with the images of FIGS. 17A and 17B, according to an example embodiment.
Figures 18A, 18B, 18C:
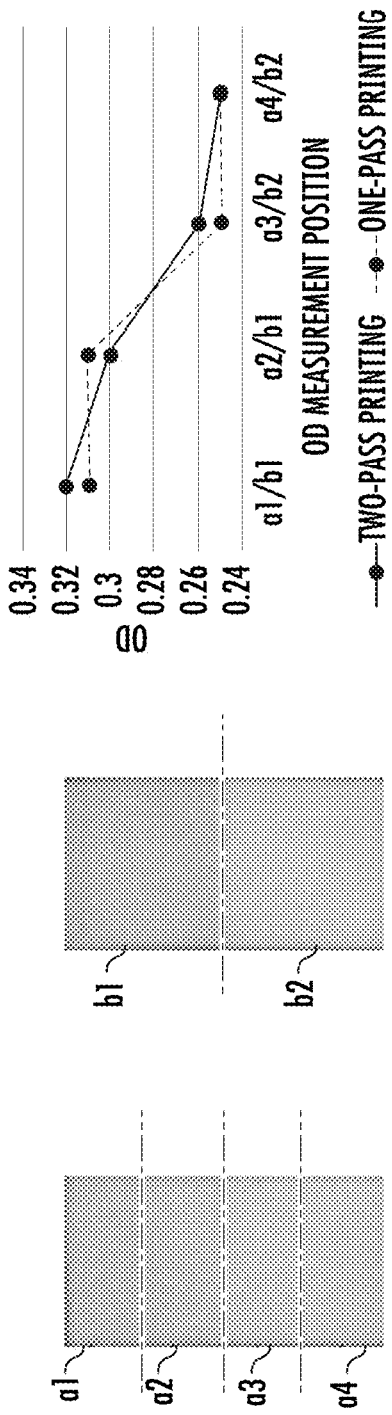
FIG. 18A is an image of another media sheet after another two-pass printing operation, according to an example embodiment.
FIG. 18B is an image of another media sheet after another one-pass printing operation, according to an example embodiment.
FIG. 18C is a chart showing various optical density (OD) value measurements associated with the images of FIGS. 18A and 18B, according to an example embodiment.

FIGS. 16A-18C provide additional example experiment images and corresponding data. These images and data were derived by applying the same procedure disclosed in the description of FIGS. 15A-15C. For example, FIGS. 16A, 17A, and 18A each show images of media sheets after applying corresponding two-pass printing experiments, FIGS. 16B, 17B, and 18B each show images of media sheets after applying corresponding one-pass printing experiments, and FIGS. 16C, 17C, and 18C are each charts showing corresponding OD value measurements of each grid on both of the media sheets from the corresponding two-pass and one-pass experiments (e.g., FIG. 16C shows the OD value measurements for FIGS. 16A and 16B, FIG. 17C shows the OD value measurements for the media sheets of FIGS. 17A and 17B, and FIG. 18C shows the OD value measurements for the media sheets of FIGS. 18A and 18B). The exposure time of each grid of these figures are listed (in seconds) in the table below:

TABLE 1

The exposure time of each grid in FIGS.
16A, 16B, 17A, 17B, 18A, and 18B

|  | a1 | a2 | a3 | a4 | b1 | b2 |
|---|---|---|---|---|---|---|
| FIGS. 16A and 16B | 5 | 6 | 7 | 8 | 5 | 8 |
| FIGS. 17A and 17B | 8 | 9 | 10 | 12 | 8 | 12 |
| FIGS. 18A and 18B | 15 | 17 | 19 | 21 | 15 | 21 |

As shown in FIGS. 15A-18C, the two-pass printing method effectively enhances the resolution and smooths out the color transition over a wider OD range, as compared to the one-pass printing method.

Accordingly, the present disclosure provides methods for enhancing the resolution of an optical printer in the sub-scan direction by applying a set of printing algorithms. In a broad sense, the set of printing algorithms described herein may be applied to any printing system that utilizes radiative-energy-sensitive (e.g., light) microcapsules. As compared to traditional optical printing procedures, the present disclosure provides a higher resolution in the sub-scan direction (e.g., not limited by the dimensions of each individual exposure element), while still retaining any sharp edges within the image date.

The present disclosure contemplates methods, systems, and program products on any machine-readable media for accomplishing various operations, e.g., of the control unit 116. The embodiments of the present disclosure may be implemented using existing computer processors, or by a special purpose computer processor for an appropriate system, incorporated for this or another purpose, or by a hardwired system. For example, the abovementioned description, steps, procedures and/or processes including suggested steps can be implemented using hardware, software, firmware (known as a combination of a hardware device and computer instructions and data that reside as read-only software on the hardware device), an optical printer, or a combination thereof. Examples of hardware can include analog, digital, and mixed circuits known as microcircuits, microchips, or silicon chips. Examples of the optical printer may include a system on chip (SoC), system in package (SiP), a computer on module (CoM), and an electrical system.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor (e.g., the control unit 116). By way of example, such machine-readable media can comprise read-only memory (ROM); flash memory; random access memory (RAM); EPROM; EEPROM; hard disk; other optical disk storage, magnetic disk storage, or magnetic storage devices; or any other medium which can be used to carry or store desired program code in the form of machine-executable instructions or data structures and which can be accessed by a general purpose or special purpose computer or other machine with a processor and executed to perform the various operations described herein.

Although the figures may show a specific order of method steps, the order of the steps may differ from what is depicted. For example, in some embodiments, two or more steps may be performed concurrently or with partial concurrence. Additionally, in some embodiments the above-mentioned steps may be carried out in sequence as shown above or even reversed. All such variations are within the scope of the disclosure. While various aspects and embodiments have been disclosed herein, other aspects and embodiments will be apparent to those skilled in the art. The various aspects and embodiments disclosed herein are for purposes of illustration and are not intended to be limiting, with the scope and spirit of the invention being indicated by the following claims.

What is claimed is:

1. A method for enhancing resolution of a radiation sensitive microcapsule-based printer, the method comprising:
   generating, by a controller, multiple subpixels in a sub-scan direction based on an image data set of an image to be printed on a photosensitive medium;
   mapping, by the controller, multiple grids onto the photosensitive medium, the multiple grids corresponding to the multiple subpixels;
   determining, by the controller, an exposure energy required for each grid of the multiple grids based on a corresponding subpixel of the multiple subpixels;
   allocating, by the controller, the exposure energy required for each grid into a first exposure level and a second exposure level; and
   exposing, by the controller, each grid of the photosensitive medium to the corresponding first exposure level and the corresponding second exposure level sequentially using an exposure element as the photosensitive medium passes through the radiation sensitive microcapsule-based printer in the sub-scan direction, wherein each grid is smaller in the sub-scan direction than the exposure element.

2. The method of claim 1, wherein generating the multiple subpixels in the sub-scan direction comprises:
   generating, by the controller, a scaled image data set by scaling the image data set; and
   up-sampling, by the controller, a set of image pixels of the scaled image data set to generate a set of image subpixels in the sub-scan direction, wherein a number of image subpixels in the set of image subpixels is twice a number of image pixels in the set of image pixels.

3. The method of claim 2, wherein up-sampling the set of image pixels of the scaled image data set comprises performing, by the controller, a linear interpolation to add a subpixel between at least one pair of adjacent image pixels in the sub-scan direction within the scaled image data set.

4. The method of claim 3, wherein up-sampling the set of image pixels of the scaled image data set further comprises:
   determining, by the controller, that a difference between exposure energy levels of at least one other pair of adjacent image pixels in the sub-scan direction within the scaled image data set is larger than a threshold; and
   upon determining that the difference between the exposure energy levels of the at least one other pair of adjacent image pixels is larger than the threshold, performing, by the controller, a nearest neighbor algorithm to add the subpixel between the at least one other pair of adjacent image pixels.

5. The method of claim 4, wherein the threshold is defined as one-third of a difference between a maximum value and a minimum value of the exposure energy levels of the set of image pixels from the scaled image data set.

6. The method of claim 4, wherein the difference between the exposure energy levels of the at least one other pair of adjacent image pixels being larger than the threshold is indicative of a sharp edge within the image.

7. The method of claim 4, wherein determining the exposure energy required for each grid comprises applying, by the controller, an exposure energy level offset to at least one grid of the multiple grids.

8. The method of claim 2, further comprising determining, by the controller, a printing resolution of the radiation sensitive microcapsule-based printer based on a spot size of the exposure element.

9. The method of claim 8, wherein generating the scaled image data set by scaling the image data set is performed based on the determined printing resolution of the radiation sensitive microcapsule-based printer.

10. The method of claim 1, wherein a size of each grid of the photosensitive medium is Dx×Dy/2, wherein Dx is a length of the exposure element along a main scan direction and Dy is a length of the exposure element along the sub-scan direction, the main scan direction being perpendicular to the sub-scan direction.

11. The method of claim 1, wherein a total exposure energy level for each grid of the multiple grids is equal to the corresponding first exposure level for the grid plus the corresponding second exposure level for the grid.

12. The method of claim 1, wherein the second exposure level for a first grid of the multiple grids is equal to the first exposure level for a second grid immediately adjacent to and immediately following the first grid as the photosensitive medium is moved in the sub-scan direction.

13. A method for enhancing resolution of a radiation sensitive microcapsule-based printer, the method comprising:
generating, by a controller, multiple subpixels in a sub-scan direction based on an image data set of an image to be printed on a photosensitive medium;
mapping, by the controller, multiple grids onto the photosensitive medium, the multiple grids corresponding to the multiple subpixels;
determining, by the controller, an exposure energy required for each grid of the multiple grids based on a corresponding image subpixel of the multiple subpixels;
allocating, by the controller, the exposure energy required for each grid into a set of sub-energy exposure levels, wherein a number of sub-energy exposure levels in the set of sub-energy exposure levels is N; and
exposing, by the controller, each grid of the photosensitive medium to the corresponding set of sub-energy exposure levels sequentially using an exposure element as the photosensitive medium passes through the radiation sensitive microcapsule-based printer in the sub-scan direction, wherein each grid is smaller in the sub-scan direction than the exposure element.

14. The method of claim 13, wherein generating the multiple subpixels comprises:
generating, by the controller, a scaled image data set by scaling the image data set; and
up-sampling, by the controller, a set of image pixels of the scaled image data set to generate a set of image subpixels in the sub-scan direction, wherein a number of image subpixels in the set of image subpixels is N times a number of image pixels in the set of image pixels.

15. The method of claim 14, wherein up-sampling the set of image pixels of the scaled image data set to generate the set of image subpixels in the sub-scan direction comprises performing, by the controller, a linear interpolation to add N−1 subpixels between at least one pair of adjacent image pixels in the sub-scan direction within the scaled image data set.

16. A radiation sensitive microcapsule-based printer comprising:
an exposure element array including a set of exposure elements;
a media transportation system configured to transport a photosensitive medium along a sub-scan direction;
a controller including a processor and a memory having instructions stored thereon that, when executed by the processor, cause the processor to:
generate multiple subpixels in the sub-scan direction based on an image data set of an image to be printed on the photosensitive medium;
map multiple grids onto the photosensitive medium, the multiple grids corresponding to the multiple subpixels;
determine an exposure energy required for each grid of the multiple grids based on a corresponding subpixel of the multiple subpixels;
allocate the exposure energy required for each grid into a first exposure level and a second exposure level; and
expose each grid of the photosensitive medium to the corresponding first exposure level and the corresponding second exposure level sequentially using an exposure element of the set of exposure elements as the photosensitive medium passes through the radiation sensitive microcapsule-based printer in the sub-scan direction, wherein each grid is smaller in the sub-scan direction than the exposure element.

17. The radiation sensitive microcapsule-based printer of claim 16, wherein generating the multiple subpixels in the sub-scan direction comprises:
generating a scaled image data set by scaling the image data set; and
up-sampling a set of image pixels of the scaled image data set to generate a set of image subpixels in the sub-scan direction, wherein a number of image subpixels in the set of image subpixels is twice a number of image pixels in the set of image pixels.

18. The radiation sensitive microcapsule-based printer of claim 17, wherein up-sampling the set of image pixels of the scaled image data set comprises performing a linear interpolation to add a subpixel between at least one pair of adjacent image pixels in the sub-scan direction within the scaled image data set.

19. The radiation sensitive microcapsule-based printer of claim 18, wherein up-sampling the set of image pixels of the scaled image data set further comprises:
determining, by the controller, that a difference between exposure energy levels of at least one other pair of adjacent image pixels in the sub-scan direction within the scaled image data set is larger than a threshold; and
upon determining that the difference between the exposure energy levels of the at least one other pair of adjacent image pixels is larger than the threshold, performing, by the controller, a nearest neighbor algorithm to add the subpixel between the at least one other pair of adjacent image pixels.

20. The radiation sensitive microcapsule-based printer of claim 19, wherein the threshold is defined as one-third of a difference between a maximum value and a minimum value of the exposure energy levels of the set of image pixels from the scaled image data set.

* * * * *